(12) United States Patent
  Bryson

(10) Patent No.: US 10,803,647 B1
(45) Date of Patent: Oct. 13, 2020

(54) GENERATING ANIMATION RIGS USING SCRIPTABLE REFERENCE MODULES

(71) Applicant: DreamWorks Animation LLC, Glendale, CA (US)

(72) Inventor: Stuart Bryson, Neutral Bay (AU)

(73) Assignee: DreamWorks Animation LLC, Glendale, CA (US)

( * ) Notice: Subject to any disclaimer, the term of this patent is extended or adjusted under 35 U.S.C. 154(b) by 0 days.

(21) Appl. No.: 16/375,740

(22) Filed: Apr. 4, 2019

(51) Int. Cl.
  *G06T 13/40* (2011.01)
  *G06F 9/451* (2018.01)
  *G06F 3/0484* (2013.01)

(52) U.S. Cl.
  CPC .......... *G06T 13/40* (2013.01); *G06F 3/04845* (2013.01); *G06F 9/451* (2018.02); *G06T 2200/24* (2013.01)

(58) Field of Classification Search
  CPC ..... G06T 13/40; G06T 2200/24; G06F 9/451; G06F 3/04845
  See application file for complete search history.

(56) References Cited

U.S. PATENT DOCUMENTS

| | | | |
|---|---|---|---|
| 2006/0059253 A1* | 3/2006 | Goodman | G06Q 10/10 709/223 |
| 2014/0253561 A1* | 9/2014 | Marvie | G06T 13/80 345/473 |
| 2015/0022517 A1* | 1/2015 | Jutan | G06T 13/40 345/419 |
| 2019/0206145 A1* | 7/2019 | Li | G06T 13/40 |

* cited by examiner

Primary Examiner — Chong Wu
(74) Attorney, Agent, or Firm — Lee, Hong, Degerman, Kang & Waimey PC

(57) ABSTRACT

Systems and methods for generating an animation rig using scripted reference modules are disclosed. An embodiment includes obtaining a first reference module for generating a first node of a dependency graph, where the first reference module is a precomputed rig module corresponding to the first node, obtaining a second reference module for generating a second node of the dependency graph, where the second reference module is scripting language data executed for generating the second node, generating an association between the first node and the second node in response to an input defining the association, generating the animation rig using the first node and the second node, and providing the generated animation rig to a rig interface.

24 Claims, 18 Drawing Sheets

GENERATING ANIMATION RIGS USING SCRIPTABLE REFERENCE MODULES

BACKGROUND

Computer animation and other computer modeling applications combine two-dimensional (2D) or three-dimensional (3D) models of objects or characters and their corresponding programmed or keyframed movement. These models are constructed out of geometrical vertices, faces, and edges in a 3D coordinate system to define an outer mesh or surface of a character or object. The models are typically associated with a hierarchical set of interconnected members used to animate or pose the model, often referred to as a skeleton or rig. The rig may include internal structural members arranged and organized much like the bones of a human skeleton to provide structure and define various movements of the character or object. The process of creating a unified set of skeletal members for a character or object is often referred to as rigging.

Once a character or object is rigged, the skeleton is surrounded by a surface mesh representing the object or character's boundaries. A user may manipulate the object or character using controls associated with the rig elements to define movements and pose the character as desired, without having to manually generate deformations of the mesh for each frame of an animation project. A 3D surface mesh may have a high level of resolution and include polygons, or faces, of various sizes making up the surface of the mesh, and the surface mesh may be shaped and deformed as required by a user or other operator to achieve a desired result.

Generating a rig or rigging in computer generated or enabled animation is typically performed using a hierarchical system of nodes called a dependency graph, which is implemented using an acyclic graph where each node includes a function which will operate on its input data and the graph defines how data flows from one node to the next. The nodes of a dependency graph may be graphically represented in an interface to represent the various elements of a character or object's skeleton or rig, where the nodes are interconnected to define data dependencies and each node's influence on other connected nodes of the rig.

One method of generating a character or object rig is to construct the character or object using a computer program scripting language, such as Python, Maya Embedded Language (MEL), MAXScript, and the like. This method requires the user to write script which will generate the full character or portion of the character to the desired specifications, and also allows development of reusable script by including parameter-enabled scripts to customize the script for each separate use case. However, the scripting approach requires the user to be fully proficient in writing script which may be difficult and very time consuming.

Another approach to generating a character or object rig is to heavily utilize the interactive features of digital content creation (DCC) applications which allow use of pre-constructed graphs for various characters and/or objects, and elements thereof. The pre-constructed graphs may be stored in predefined libraries which are populated by users authoring the graphs using interactive and scripting tools. Such predefined libraries allow the user to interactively generate a character or object rig by referencing the precomputed modules from the predefined library and using a graphical interface to create and edit the dependency graph, including creating joints and connections between rig elements, manipulating rig elements, setting limits on movements between rig elements, and the like.

This method provides a highly interactive approach to generating a character or object rig, however it relies heavily on the interactive construction of precomputed graph modules which may not provide the flexibility that is necessary in some animation cases. Accordingly, in many cases the user is forced to create the character or object as desired using the interactive precomputed reference module approach, and then attempting to reverse engineer the created character or object to generate the corresponding script for reuse of the module.

Existing DCCs are therefore limited to using either the reference module approach or a scripted approach. There is no efficient way of utilizing the advantages of both approaches in a single implementation. Thus, the existing systems and methods are unable to provide an efficient solution for combining the benefits of the reference module approach and the scripting approach for generating rigs for animated characters or objects which are customizable and reusable. Therefore, it may be advantageous to provide rig generating tools which implement scriptable reference modules which are compatible with precomputed reference modules in DCC rig generation interfaces.

SUMMARY

Embodiments of the present disclosure include systems, methods, and computer-readable media for generating animation rigs using scriptable reference models.

An embodiment of a method of the present disclosure for generating an animation rig comprises obtaining a first reference module from a memory for generating a first node of a dependency graph of the animation rig and providing the first node to a rig interface, wherein the first reference module is a precomputed rig module corresponding to the first node, obtaining a second reference module from the memory for generating a second node of the dependency graph and providing the second node to the rig interface, wherein the second reference module is scripting language data executed for generating the second node, generating an association between the first node and the second node in response to an input defining the association, generating the animation rig using the first node and the second node, and providing the generated animation rig to the rig interface.

An embodiment of a machine-readable non-transitory medium of the present disclosure includes machine-readable non-transitory medium having stored thereon machine-executable instructions for generating an animation rig, the instructions comprising obtaining a first reference module from a memory for generating a first node of a dependency graph of the animation rig and providing the first node to a rig interface, wherein the first reference module is a precomputed rig module corresponding to the first node, obtaining a second reference module from the memory for generating a second node of the dependency graph and providing the second node to the rig interface, wherein the second reference module is scripting language data executed for generating the second node, generating an association between the first node and the second node in response to an input defining the association, generating the animation rig using the first node and the second node, and providing the generated animation rig to the rig interface.

An embodiment of a system of the present disclosure for generating an animation rig comprises a display, an input interface configured to receive inputs, and one or more processors configured to obtain, from a memory associated with the system, a first reference module for generating a first node of a dependency graph of the animation rig and displaying the first node in a rig interface via the display, wherein the first reference module is a precomputed rig module corresponding to the first node, obtain, from the memory, a second reference module for generating a second node of the dependency graph and displaying the second node in the rig interface via the display, wherein the second reference module is scripting language data executed for generating the second node, and generate an association between the first node and the second node in response to an input received via the input interface defining the association, generate the animation rig using the first node and the second node, and display the generated animation rig in the rig interface via the display.

An embodiment of a system of the present disclosure for generating an animation rig includes means for obtaining a first reference module from a memory for generating a first node of a dependency graph of the animation rig and providing the first node to a rig interface, wherein the first reference module is a precomputed rig module corresponding to the first node, obtaining a second reference module from the memory for generating a second node of the dependency graph and providing the second node to the rig interface, wherein the second reference module is scripting language data executed for generating the second node, generating an association between the first node and the second node in response to an input defining the association, generating the animation rig using the first node and the second node, and providing the generated animation rig to the rig interface.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

Figure 1A:
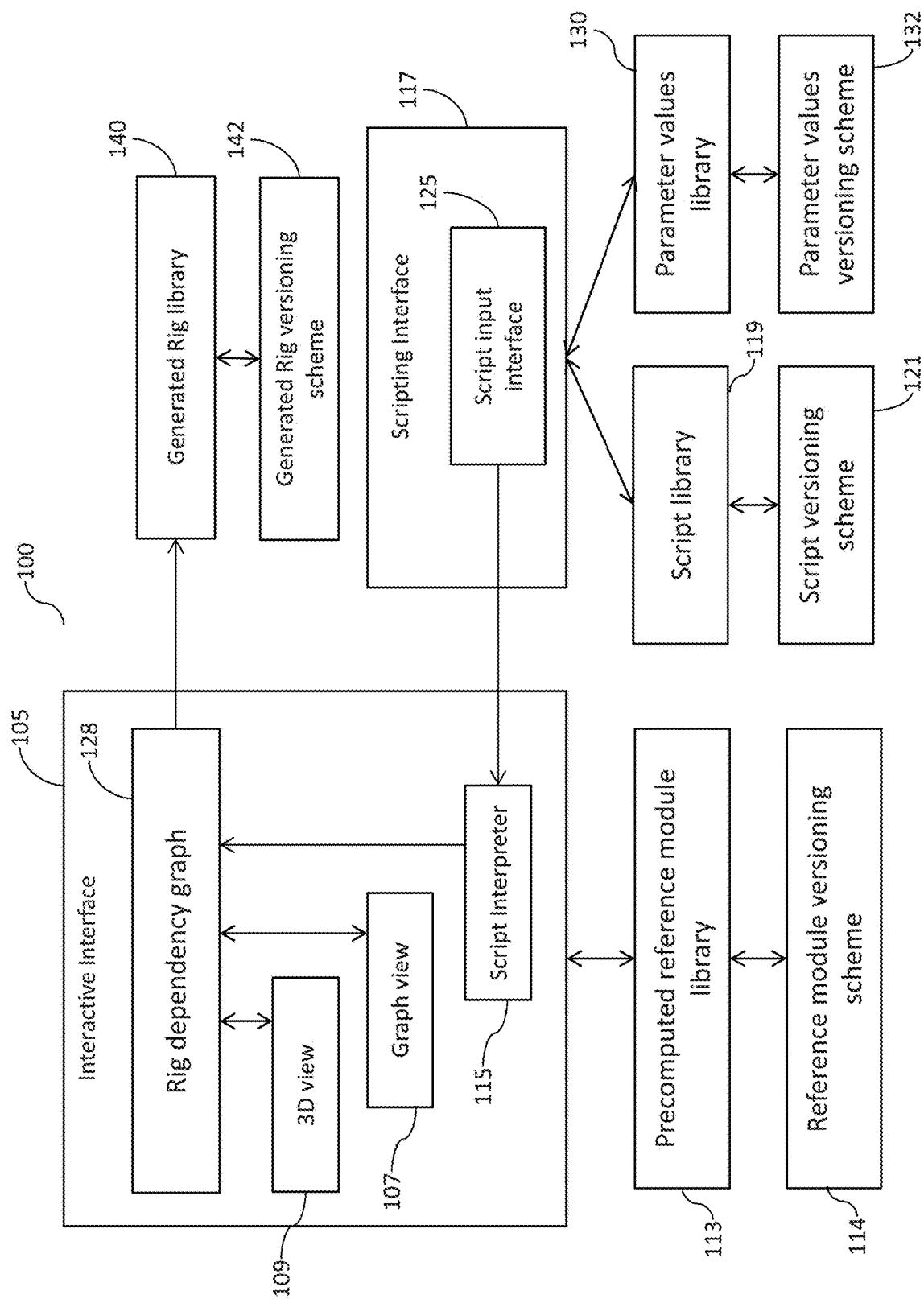
FIG. 1A is a diagram showing an architecture of an animation rigging application according to existing implementations.

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

While this disclosure is presented in the context of 3D animation applications, it is not limited thereto, and other implementations of the systems, media, and methods described herein are contemplated, including generation of rigs for characters or objects within a 2D or 3D coordinate system, as well as for various interactive geometric modeling applications involving production and modification of geometric models, including, but not limited to, rigging, animation, architecture, automotive design, consumer product design, virtual reality applications, augmented reality applications, game development, visual effects, 3D printing, and the like, including applications outside of the animation industry to other industries that rely on scripting and visual programming. Any reference in this disclosure to a geometric model or components thereof, within a 3D model or 3D space will be understood to include the disclosure as applicable to 2D models and 2D spaces.

In this disclosure, the term "character," "object," or "model" may include any suitable computer representation or geometric model of part or all of an entity, such as a character, a landscape, an inanimate object, or any other virtual, modeled, and/or animated entity. Objects may be constructed, for example, out of geometrical vertices, edges, and/or faces in a 2D or 3D coordinate system. A "point," "vertex," "edge," or "component" may include one of a set of elements used to determine the shape, movement, appearance, and/or absolute or relative positioning of a 3D model, including but not limited to vertices, points, edges, and faces of a 2D or 3D model. Any description of the present disclosure with respect to one of a point, a vertex, an edge, or a face will be understood to apply equally and/or analogously to the others of a point, a vertex, an edge, or a face where applicable, as will be understood by one of ordinary skill in the art, and use of one term over another within this disclosure will not be deemed to be limiting to only the term being used.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

Referring now to FIG. 1A, a simplified example of an animation rigging application 100 is discussed. For the purposes of this discussion, the animation rigging application 100 is shown as separately implemented from other components of a digital content creation (DCC) application or a full animation software suite, however it will be understood by those of ordinary skill in the art that the animation rigging application 100 may be implemented as a part of a larger animation software package, such as a DCC application, which is enabled to perform all or various other stages of the animation process.

The animation rigging application 100 may include an interactive interface 105 enabled to receive input from a user to create and edit a character or object rig. The interactive interface 105 may enable the user to utilize a graphic interface for selecting and arranging various modules of a rig dependency graph 128 to generate the character rig.

The interactive interface 105 may include a graph view 107 which includes a graphical node representation of the rig dependency graph 128 wherein the connections between the nodes and the nodes themselves may be viewed and edited by a user. The interactive interface 105 may also include a 3D view 109 enabled by a graphics renderer (not depicted) which shows a 3D representation of the rigged character, allowing the user to manipulate joints or connections of the rig directly on the 3D view 109 of the character rig.

Figure 1B:
FIGS. 1B and 1C are examples of views of a character rig according to existing implementations.

For example, referring to FIG. 1B, a 3D view interface 141 is shown of a dragon which includes a rendered 3D representation of a character rig, wherein the rig includes a spine, two legs, and two arm elements. Alternatively, the rig dependency graph 128 may be viewed and/or edited by the user in the graph view 107 which depicts the dependency graph as a visual graph representation of the character rig, including the connections and dependencies between the rig elements. For example, referring to FIG. 1C, a graph view interface 160 is shown of the character rig of FIG. 1B (excluding the tail), where the rig dependency graph 128 is shown to include nodes for a spine, a right leg, a left leg, a right arm, and a left arm element.

Within the graph view 107, or within a separate view in some embodiments, the user may be presented with a resource browser (discussed further below) of selectable precomputed reference modules which are available for inclusion into the rig dependency graph 128. The selectable precomputed reference modules may be stored and provided from a precomputed reference module library 113 which is implemented and maintained locally at a terminal executing the animation rigging application 100, or in other embodiments the precomputed reference module library 113 may be implemented and maintained in a remote terminal (not depicted), such as a server, which is in communication with the terminal executing the animation rigging application 100 via a network connection or the like.

The precomputed reference module library 113 may store and maintain precomputed rig modules for use in various rigging applications. The precomputed rig modules may include components of character or object rigs which may be reused and applied to various different rigs. The precomputed reference module library 113 may be populated by users who create rig modules from scratch which are added to the library, where the creation of the rig modules are performed either by interactively connecting core graph nodes together and constructing a new module or writing a script for generating the rig module.

A precomputed reference module contains a set of nodes and connections to define its behavior. For example, the precomputed reference module library 113 may include rig modules for torsos, heads, legs, arms, wings, tails, and the like, which may be modularly referenced and applied to different characters or objects. The precomputed reference module library 113 may be included in a rig dependency graph 128 and edited or partially overridden by the user to suit each particular use. Each module may include various sub-modules which make up the module, including various bones, joints, and defined movements.

For example, an arm module may include nodes including a predefined shoulder joint, an elbow, and a wrist joint which make up the arm module. The interactive interface 105 may allow the user to drill down into each precomputed reference module to view and/or edit any of the included sub-modules to customize the module for each particular use.

The various modules may be organized by category within the precomputed reference module library 113 or sorted based on different criteria based on a need of the user. For example, all arm modules may be organized within an arm category and all leg modules may be organized within another leg category, regardless of the type of arms or legs or characters to which they apply. In other cases, the user may select to filter or sort the modules within the precomputed reference modules using a particular character-based criterion. For example, the user may be working on a project involving a quadruped and the library may be filtered or sorted such that only legs and other modules applicable to quadruped characters are shown.

In some cases, precomputed reference modules in the library may have different access or availability based on their intended use. As an example, some precomputed reference modules stored in the library may not be publicly available to all users as they are intended to be nested within another precomputed reference module and not intended for standalone implementation in other rigs. For example, the library may store a precomputed leg module for a body of a particular character including four legs, where each leg itself is a precomputed reference module. However, if the precomputed reference module for the leg is not useful in other character rigs, access to that particular precomputed reference module may be limited. However, storage and maintenance of the precomputed reference module for the leg may still prove valuable as the user may be able to instantiate four separate instances of the leg module in the particular character.

The precomputed reference module library 113 may be associated with a precomputed reference module versioning scheme 114 which stores version control information for the reference modules stored in the precomputed reference module library 113. The precomputed reference module versioning scheme 114 may include version information for each of the precomputed modules, including date of revision, authoring information, description and comment information, and the like associated with each version of the precomputed reference modules stored in the library 113. A module's version may be the sum of its nodes and connections, and the versions of any modules it references and if a node or connection is added, edited, or removed, the version is updated.

Thus, utilizing the interactive interface 105, the precomputed reference module library 113 and the precomputed reference module versioning scheme 114, the user may select, arrange, and edit modules for generating an output character rig.

Additionally, the animation rigging application 100 may also enable a user to generate a character rig using a scripting language, such as Python, MEL, MAXScript, and the like. The animation rigging application 100 may include a scripting interface 117 to enable the user to write, edit, or import script for generating a rig dependency graph 128 for a character rig. Similarly to the precomputed reference module library 113, a script library 119 may be provided to the animation rigging application 100, implemented locally or at an external terminal, such as a server, as similarly discussed with respect to the precomputed reference module library 113.

The script library 119 may store and provide prewritten script modules for selection and inclusion in writing script to generate a dependency graph for a character rig. The script library 119 may be populated by users who create rig modules from scratch which are added to the library, where the creation of the rig modules are performed by writing a script for generating the rig module. A scripted module contains a script that describes how to construct the nodes and connections. The scripted module may also contain a set of parameters that are used for execution of the script. The prewritten script modules may be stored, organized, sorted, and selected for inclusion in a script via a resource browser of the animation rigging application 100 provided via the script input interface 125, similar to the resource browser for the precomputed reference module library 113 discussed above.

The main advantage of scripting over module referencing may be that scripting can change the rig dependency graph structure of the rig, not just the values of a given module. An example of this is when constructing a rig for a dragon character's tail, where each segment of the tail requires a set of interconnected nodes. The module reference approach requires a graph that contains the maximum number of tail segments needed for any instance of the module. The module must then allow unused segments to be ignored during evaluation of the rig. A script however, can parameterize the number of segments required and only create the exact number of required nodes in the graph. However, if the user wishes to use a script for one portion of the dependency graph, there is no ability to use the desired script for that portion and use the interactive interface 105 for generating the remainder of the graph since the two interfaces are not interoperable.

The script library 119 may also be associated with a script versioning scheme 121 which stores version control information for the prewritten script modules stored in the script library 119. The script versioning scheme 121 may include version information for each of the script modules, including date of revision, authoring information, description and comment information, and the like associated with each version of the script modules stored in the script library 119. Notably, the script versioning scheme 121 and the precomputed reference module versioning scheme 114 will be different and not synchronized with the data in the other, such that the versioning information between the precomputed reference modules in library 113 are not matched up with the script modules in the script library 119, even if they correspond to the same resulting modules. Accordingly, selecting particular modules from the precomputed reference module library 113 and from the script library 119 to accomplish a particular version of the character rig requires keeping track of disparate versioning schemes between schemes, 115, 121.

A parameters values library 130 may also be provided to store and keep track of the various parameter values which have been entered to instantiate modules using script from the script library 119. Since the parameter values may have a direct impact on the resulting rig (for example, a parameter value that determines the number of segments of a dragon's tail), these parameter values are also versioned and tracked in the parameter values versioning scheme 132, configured to store parameter values along with corresponding version numbers or other version tracking data.

Thus, in a single project for a single character rig, a user—via the animation rigging application 100—may utilize various resources from the precomputed reference module library 113, the script library 119, and the parameter values library 130, where each of the utilized resources are referenced by the final resulting rig file based on versioning information of each resource provided separately by the reference module versioning scheme 114, the script versioning scheme 121, and the parameter values versioning scheme 132.

Additionally in some cases, a generated rig library 140 may also be provided which includes precomputed rigs for entire characters or objects which can be reused and referenced again for efficiency. Similar to the precomputed reference module library 113, the script library 119, and the parameter values library 132, the generated rig library 140 may also be associated with its own generated rig versioning scheme 142 which tracks and maintains versioning information for the entire precomputed rig, which is itself comprised of various resources having their own versioning schemes, as noted above. The numerous disparate versioning schemes of varying resources used in a single rig project may become cumbersome, particularly where a user is required to manually track the correspondence between the versioning schemes to achieve the desired resulting rig.

The animation rigging application 100 may further include a script interpreter 115 for interpreting the script language for generating the rig dependency graph 128. The script language contains a list of function statements, also called instructions, to execute functions for generating the rig dependency graph 128. The instructions of the script language input via the script input interface 125 are supplied to the script interpreter 115 which parses the operands and operation codes from the instruction set and executes the instructions. The script interpreter 115 executes instructions on a continuous basis until the end of the script is reached or a command is executed to pause or delay the script.

FIG. 1A shows a single script interpreter 115 configured as a part of the interactive interface 105, which interprets the code input via the script input interface 125 and allows a user to view the rig dependency graph 128 generated from the script. Edits to the rig dependency graph 128 may be made directly from the 3D view 109 or the graph view 107. However, it will be noted that while a user may jump between an editing interface in the 3D view 109 or the graph view 107 to make edits, check the result of the edits in the rig dependency graph 128, and jump back into the editing interface of the 3D view 109 or the graph view 107, the user may not jump back from editing the rig dependency graph 128 via the 3D view 109 or the graph view 107 back to the script interface 125 as those edits will not be reflected in the script language editable by the user in the script input interface 125. Thus it will be noted that the arrows connecting the script input interface 125 and the rig dependency graph 128 is a one-way arrow, while the arrows connecting the 3D view 109 and the graph view 107 are two-way arrows, indicating that edited data from the rig-dependency graph will be reflected in the 3D view 109 or the graph view 107. Additionally while only one script interpreter 115 is shown in FIG. 1A, other configurations are possible where two or more instances of script interpreter 115 are provided in the animation rigging application 100, one to interpret script that is entered and edited within the interactive interface 105, and another implemented within the scripting interface 117 to interpret script code entered within the script input interface 125.

It will be noted that in example of FIG. 1A, the scripting interface 117 and the interactive interface 105 are separate as edits and changes from the 3D view 109 or the graph view 107 are not able to be written back to the scripting interface 117, thus it is not possible to easily combine features from one interface with features of the other. As a result, users are often forced to double their efforts, first creatively and visually creating a character rig as desired using the interactive interface 105 (using the 3D view 109 or the graph view 107), and then reverse engineering the created character rig to write script in the scripting interface 117 so that the script may be parameterized and reused for future use.

Figure 2:
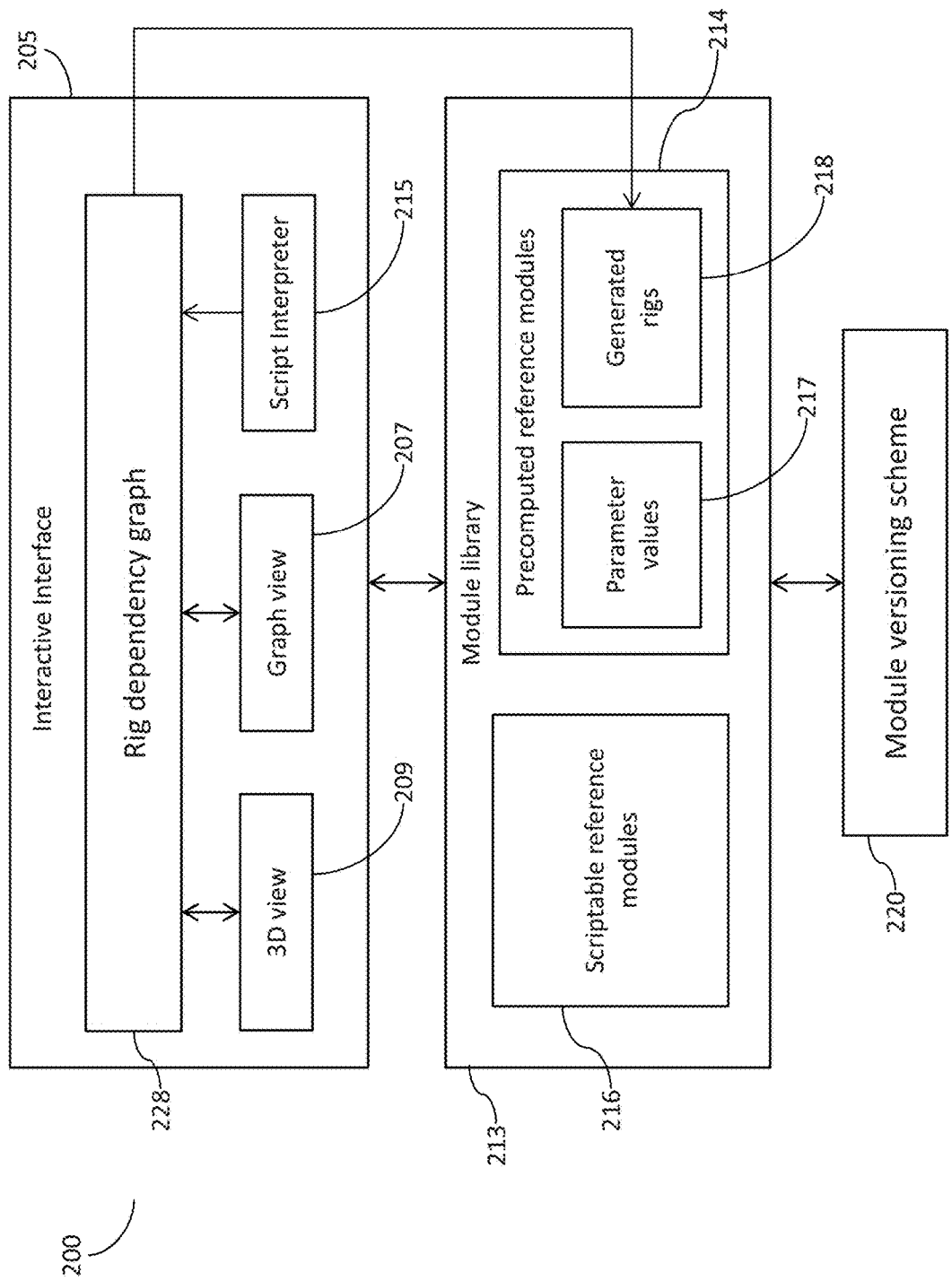
FIG. 2 is a diagram showing an architecture of an animation rigging application according to an embodiment of the present disclosure.

Referring now to FIG. 2, an example of an architecture of an animation rigging application 200 according to an embodiment of the present disclosure is depicted. Scriptable reference modules 216 are provided in the module library 213 which are available to be accessed, where the module library 213 also includes precomputed reference modules 214 similar to the precomputed reference module library 113 discussed in FIG. 1A. As shown in FIG. 2, the precomputed reference modules 214 may also include stored parameter values 217 which are set on instantiated scriptable reference modules. As will be discussed further below, when a scriptable reference module is instantiated, a user may override any parameter default values by entering parameter values to be utilized in instantiating the module. These input parameter values 217 may be stored with the precomputed reference modules 214 to define its characteristics, where the parameter values 217 are also versioned, as will be discussed further.

The module library 213 may also store and maintain generated rigs 218 created, for example, by users using a rig dependency graph 228 via the interactive interface 205. The generated rigs 218 may also be created and populated in other ways, including using scripts, or they may be predefined or prepopulated with generic character rigs. The generated rigs 218 may be stored as a precomputed reference module 214 stored in the module library 213. For example, a scripted tail module for a dragon may be instantiated and the parameter values 217 which are set for the instantiation may be stored in a precomputed reference module called "Dragon." Further, the artifacts of the script execution of the "Dragon" precomputed reference module may be stored as well. Thus, the "Dragon" precomputed reference module could then be referenced and instantiated during later use, for example in creating an animation shot. The module library 213 may be stored and maintained at a local terminal executing the animation rigging application 200, or in other embodiments it may be stored and maintained at an external terminal, such as a server, in communication with the executing terminal via a network, or the like.

The scriptable reference modules 216 may include script programming language which describes how to construct the nodes and connections for a particular component of the rig dependency graph 228 and may also contain default parameter values (not depicted) that are used for execution of the script, or these default values may be overwritten by parameter values defined in the rig dependency graph 228 and stored in another precomputed reference module. The scriptable reference modules 216 may be selected and referenced by a user via the interactive interface 205 just as the user would do for any other precomputed reference module 214 from the module library 213. The instantiated scriptable reference modules 216 may be arranged, organized, connected, and edited along with other precomputed reference modules 214 via the interactive interface 205 to generate the rig dependency graph 228 as desired.

Similar to FIG. 1A, in some embodiments, the script interpreter 215 provided with the interactive interface 205 allows the user to make changes directly to the script of a scriptable reference module 216, however any changes made to the instantiated module may not be reflected back into the script, as indicated by the one way arrow from the script interpreter 215 to the rig dependency graph 228. However, any changes made interactively to the rig dependency graph 228 may be reflected in the 3D view 209 or the graph view 207 as indicated by the corresponding two-way arrows shown in FIG. 2.

In this way, embodiments of the present disclosure combine the two approaches of precomputed reference modules 214 and scripting by introducing scriptable reference modules 216 that can be referenced by other modules, regardless of whether they are scripted or precomputed. By providing the ability to mix and match precomputed reference modules 214 and scriptable reference modules 216, the user is able to stay in the visual language of nodes and connections via the interactive interface 205, specifically the 3D view 209 and the graph view 207 of the rig dependency graph 228, and when required the user can use a script via a scriptable reference module 216. Thus, the user is not forced to use one interface or the other for the entirety of designing the rig dependency graph 228 (or recoding the script in order to reflect changes made within the interactive interface 205) but is provided with the flexibility to utilize a mix of precomputed reference modules 214 or scriptable reference modules 216 based on a particular implementation.

Additionally, in embodiments of the present disclosure, the precomputed reference modules 214 and the scriptable reference modules 216, along with parameter values 217 are versioned using a common module versioning scheme 220, as shown in FIG. 2, which improves functionality of the animation rigging application 200 and allows for accurate and efficient tracking of different versions of the precomputed reference module generated by rig dependency graph 228 and resulting character rig.

As discussed with respect to FIG. 1A, in other approaches the scripts in the script library and the precomputed reference modules in the precomputed reference module library are versioned based on separate and distinct versioning schemes. Further, even the parameter values for the scripts of a particular rig can be versioned separately from the script and precomputed reference module versioning schemes, and complete generated rigs may also be versioned separately. These approaches may result in many disparate and separate versioning schemes including precomputed reference module versioning scheme 114, script versioning scheme 121, parameter versioning scheme 132, and generated rig versioning scheme 142.

However, with reference to FIG. 2, all versioning schemes may be combined into a single module versioning scheme 220 in embodiments of the present disclosure. A character or module's version may correspond to the sum of its nodes and connections and parameters to scripted modules, and the versions of any modules it references. If a node or connection is added or removed, the version number of that character or module must be increased. Similarly, when a new version of a referenced module is created, in order for the referencing module to incorporate the change to the referenced module, it must also create a new version of itself.

In the present disclosure, the scriptable reference modules 216 are versioned modules, therefore changes to a scriptable reference module also requires the module to increase its version in the module versioning scheme 220 to incorporate the changes. Further, if a user changes the value of a parameter on an instantiated scripted module, then the module that instantiated the scripted module must increase its version. Because of this unified approach, the user does not need to also track what version of a script, or parameters were used to construct the graph and manually track correspondences between them.

FIGS. 3-13 show examples of generating a dependency graph for a character rig which implements both precomputed reference modules and scriptable reference modules 216. As discussed, one advantage of generating a rig dependency graph using scripting is the ability to parameterize the script so that the user can input certain values to customize the rig module.

Figure 1C:
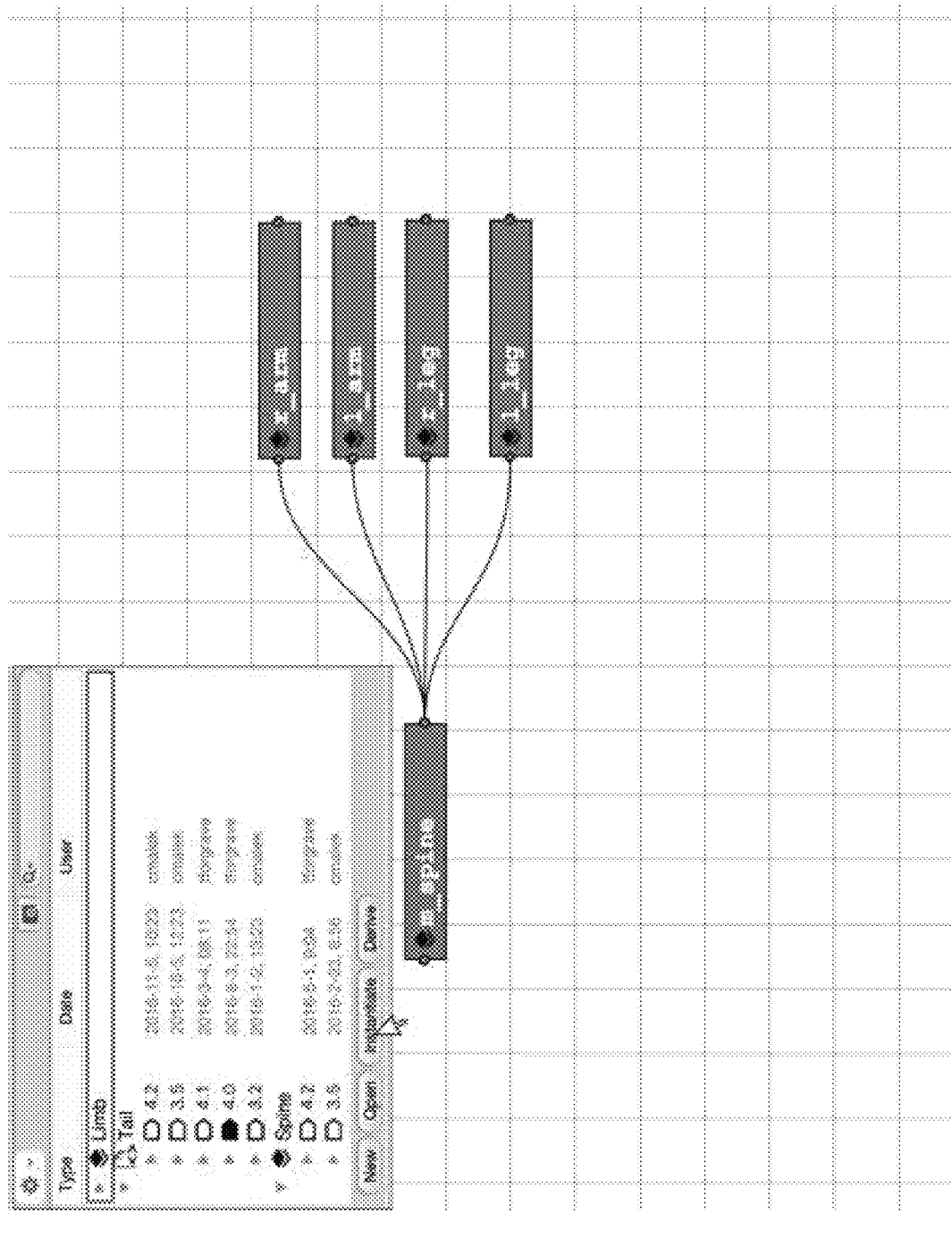

For example, when generating a character rig for a dragon character, the user may select precomputed reference modules corresponding to various portions of the rig, including the spine, right arm, left arm, right leg, and left leg, as shown in FIG. 1C. These portions of the rig may not require much customization since arms and legs do not involve much variance between similarly formed characters. However, when forming a portion of the rig such as the dragon's tail, each segment of the tail requires a set of interconnected nodes which will vary depending on various factors, including length of the tail which dictates how many segments are required.

With precomputed reference modules, the user is unable to efficiently customize the module for each use case. The user may be forced to develop and store separate precomputed reference modules for each possible length of tail which may be used in the future, or store a single precomputed reference module with a maximum number of segments and then editing the instantiated node by disabling or deleting a number of the segments to achieve the desired length. Both options lead to inefficient rig design and waste of computing resources.

For example, requiring the user to develop, store, and reuse separate precomputed reference modules for each possible length of tail may result in significantly more time and work for the user, unnecessary utilization of resources and waste of memory and disk storage space, and negatively impact user efficiency when choosing a desired module because they may be presented with a large number of different options in the module library. Additionally, requiring the user to develop, store, and reuse a single precomputed reference module with maximum number of segments may result in requiring more memory than is necessary for a particular instance, resulting in a waste of resources and unnecessary computations in the graph, and negatively impact user efficiency since the user is then required to disable a potentially large number of undesired segments of the precomputed reference module after instantiation to achieve the desired number of segments.

In such cases, utilizing a scripted reference module may enable the user to quickly and efficiently form the tail portion using script which is designed to be executed using input parameters defining certain characteristics of the node, while also using precomputed reference modules for the other non-customized portions, such as the spine, arms, and legs.

Figure 3:
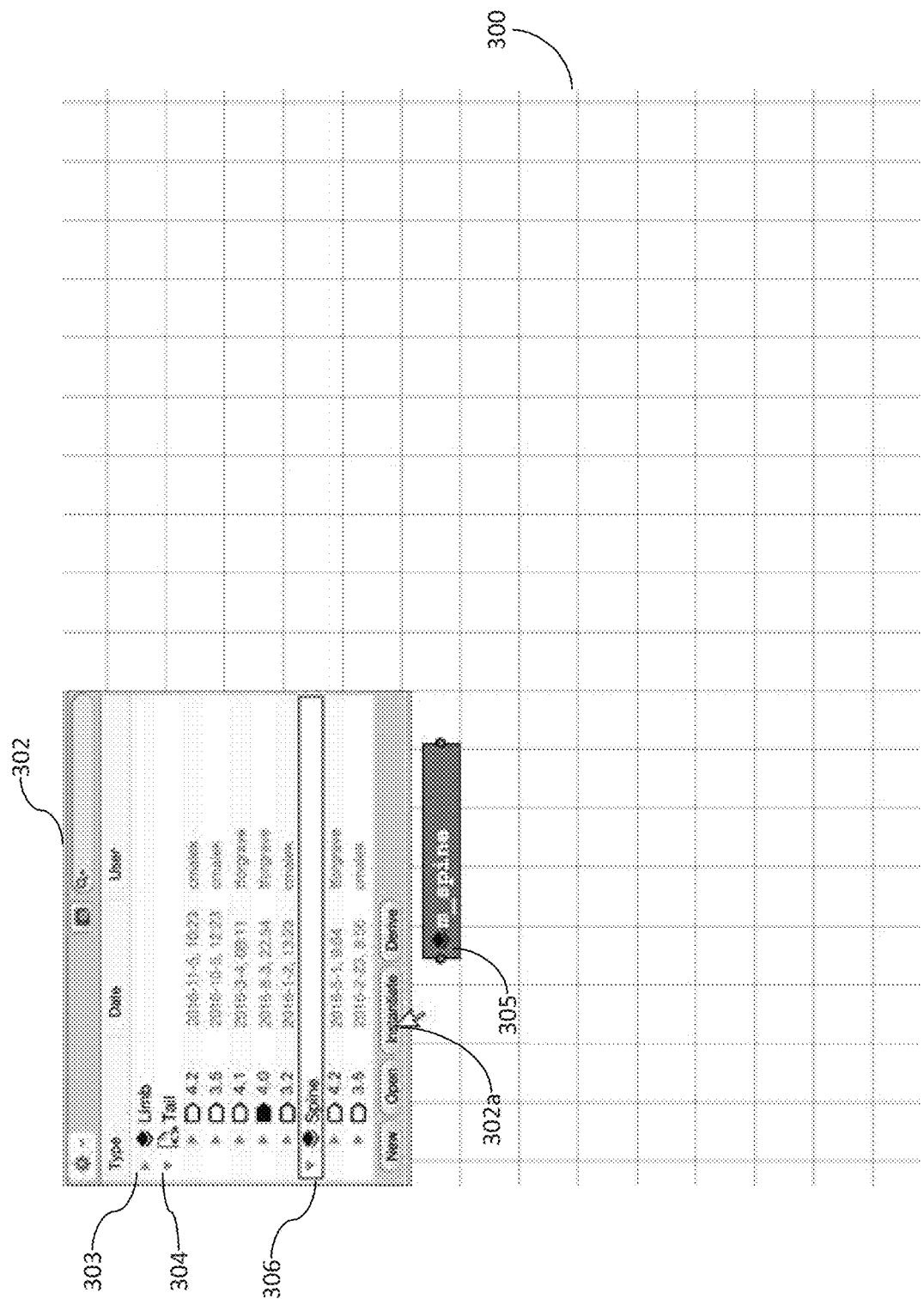
FIGS. 3, 4, 5, 6, 7, 8, 9, 10, 11, 12, and 13 are illustrations of generating an animation rig using scriptable reference modules according to embodiments of the present disclosure.

Referring now to FIG. 3, a graph view of the interactive interface 300 is shown. The interactive interface 300 may include a resource browser 302 which allows the user to browse various resources available in the precomputed reference module library, the scriptable reference module library, or any other source providing module resources. The resource browser 302 may include information on each module, such as category, character type, version number, authorship, date of modification and/or creation, preview images, and the like, allowing the user to browse and select the desired module for the current project.

In the example shown in FIG. 3, the resource browser 302 provides a list of precomputed and scriptable reference modules for a character's limb 303, spine 306, and tail 304, with each module listing including additional details, such as version number, date of creation, and the user who created it. In other embodiments, the resource browser 302 may include various other categories and additional information related to each module, including revision history, last date accessed or edited, name of the original project the module was created for, and the like.

Once the user has selected a particular module, the interactive interface 300 may receive a command input from the user for instantiating an instance of the selected module, for example via the Instantiate button 302a. In FIG. 3, after selecting a precomputed reference module for a spine 306 in the resource browser 302, the user may select to instantiate, for example by clicking an interface button labeled "instantiate", an instance of the spine module 305, named m_spine, resulting in the spine node 305, named m_spine, being displayed in the graph view.

Figure 4:
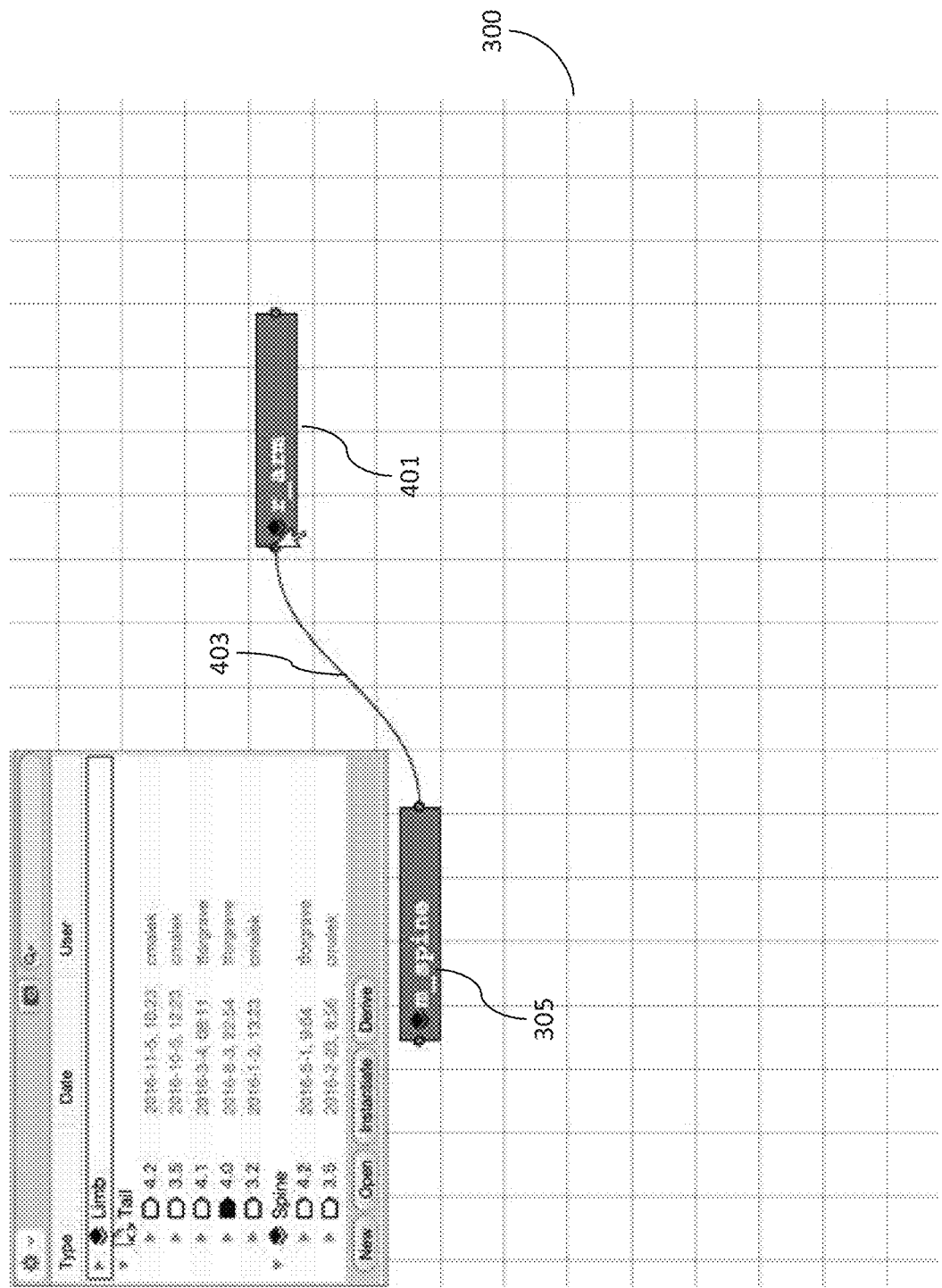

FIG. 4 shows that the user has selected a limb 303 module from the reference browser and selected to instantiate the limb, for example by clicking the instantiate button. As a result, an arm node 401, named r_arm, is displayed in the graph view. Thereafter, the user is able to use tools provided in the interactive interface 300 to define a connection 403 between the spine node 305 and the arm node 401. Accordingly, in FIG. 4, the user has created a connection 403 from the output of the spine node 305 to the input of the arm node 401. This means that r_arm is dependent on m_spine being computed before it can compute, since moving the spine node 305 will certainly affect the movement and location of the arm node 401 in most characters.

Figure 5:
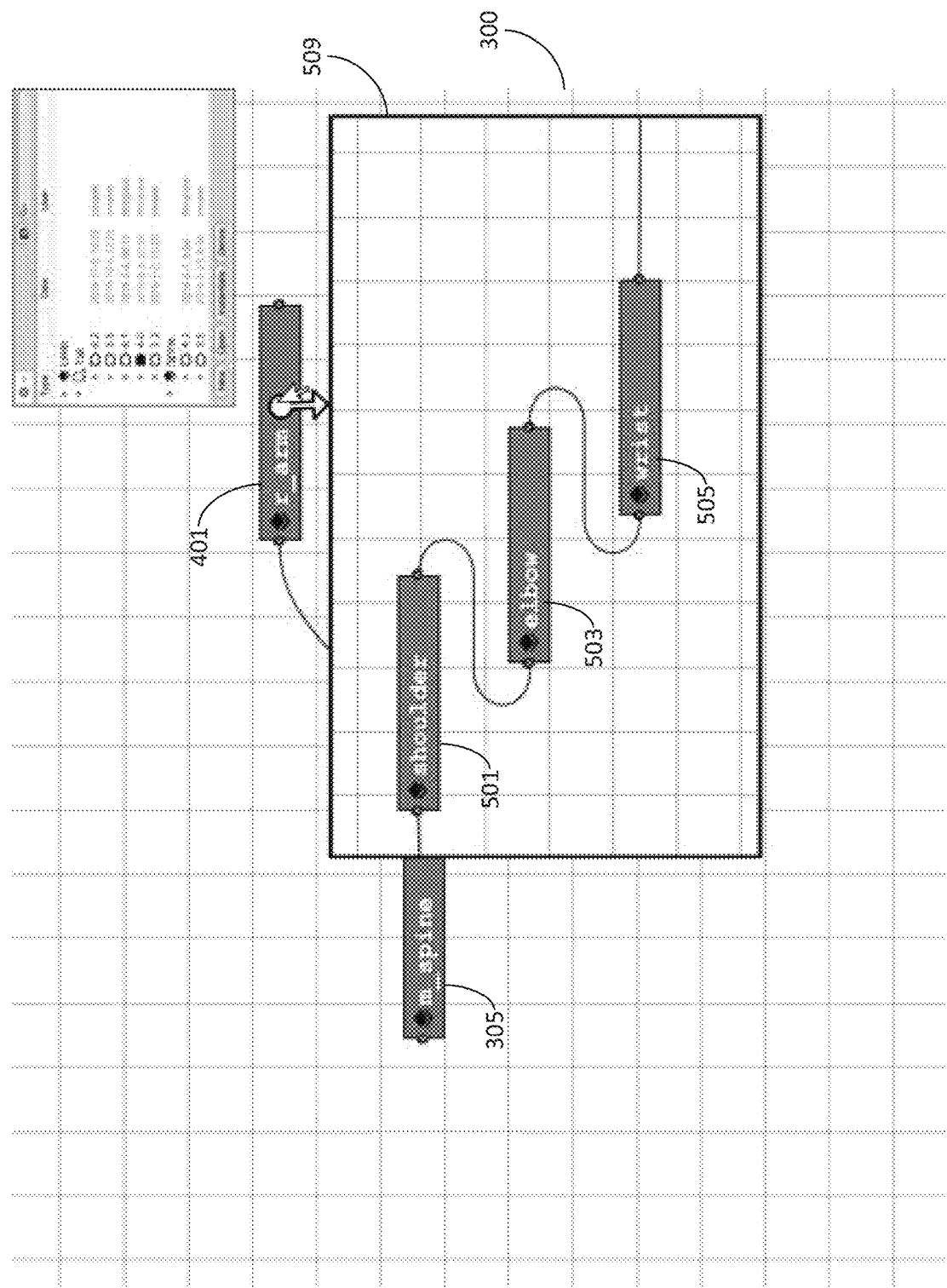

It is noted that just as with the spine node 305, the arm node 401 is based on a precomputed reference module and therefore generated using the values which have been precomputed for the particular module. Further, it includes sub-nodes which make up the arm, such as a shoulder joint, an elbow joint, and a wrist joint. As shown in FIG. 5, the user is able to inspect the internal contents of the instantiated arm node 401 via a drill down window 509, including a shoulder node 501, an elbow node 503, and a wrist node 505, and additionally edit any nodes therein to customize based on the current project.

Figure 6:
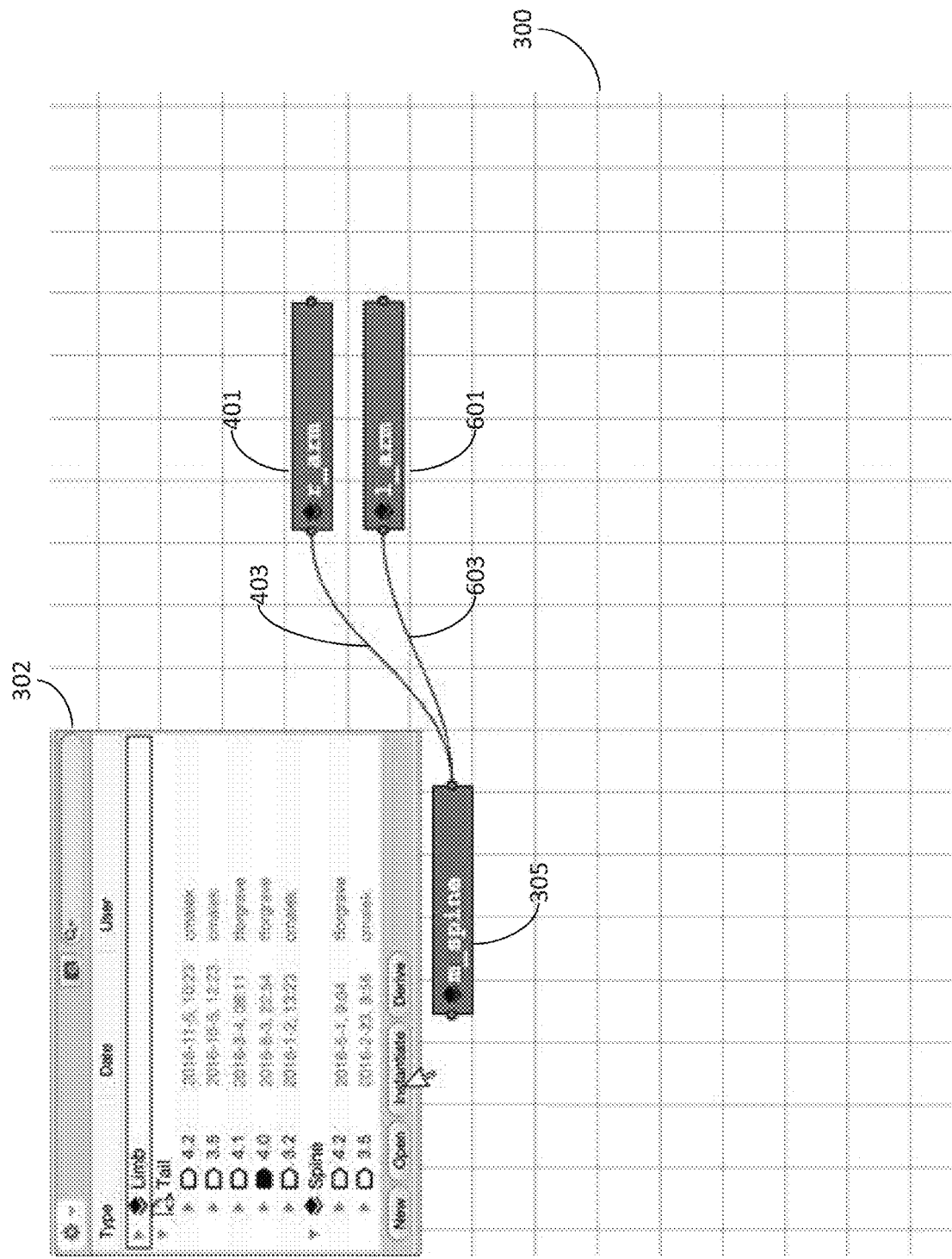
Figure 7:
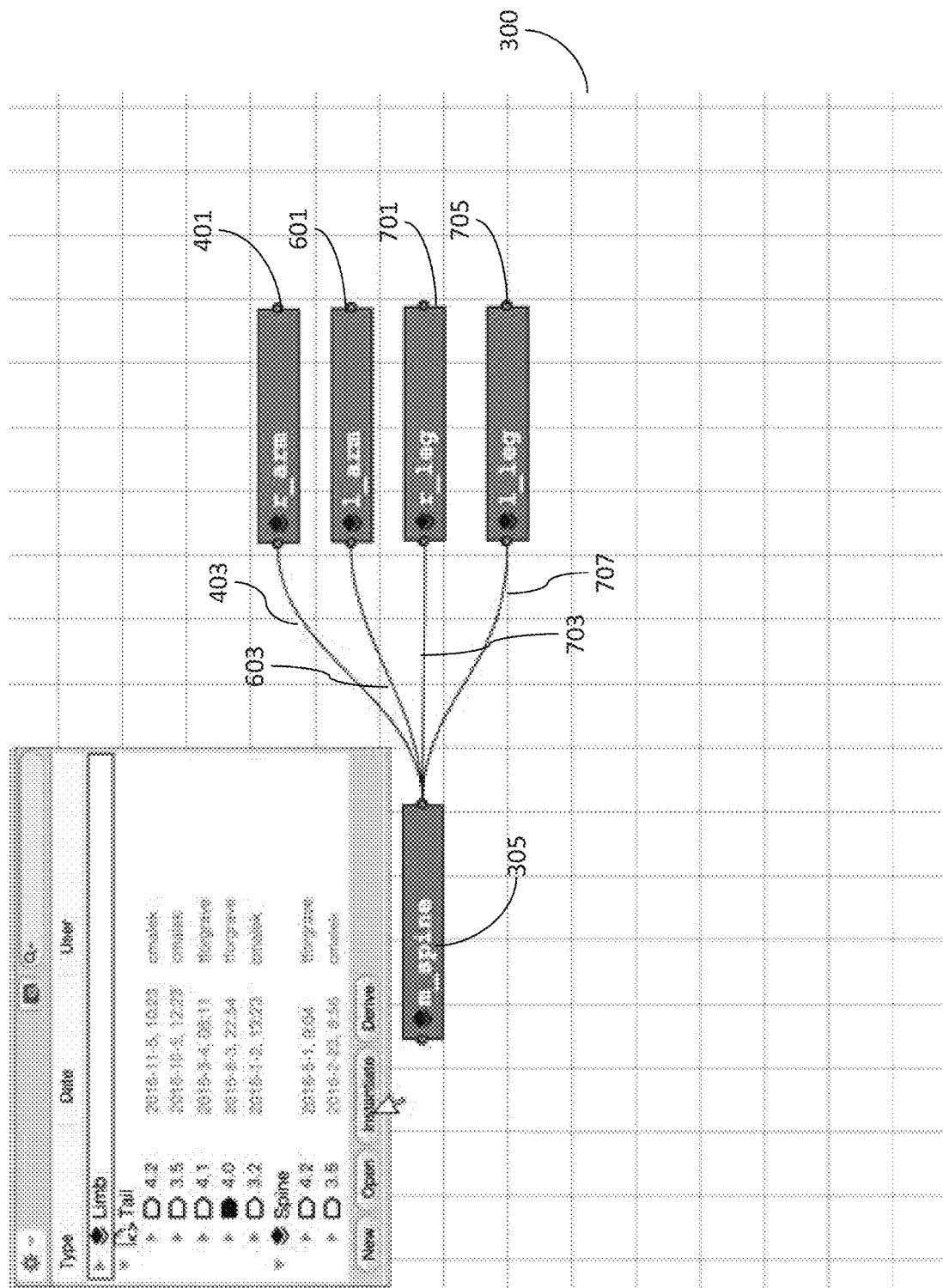

As shown in FIG. 6, the user may continue to utilize the resource browser 302 to select additional modules which make up the dragon character rig, including another arm node 601, named l_arm, corresponding to a left arm of the dragon character, and define connections between the new nodes and the existing nodes of the graph, such as connection 603. The user may continue to generate legs for the dragon character rig based on precomputed reference modules for a right leg node 701, named r_leg, and a left leg node 705, named l_leg, and the corresponding connections 703, 707 to the spine, respectively, as shown in FIG. 7.

Figure 8:
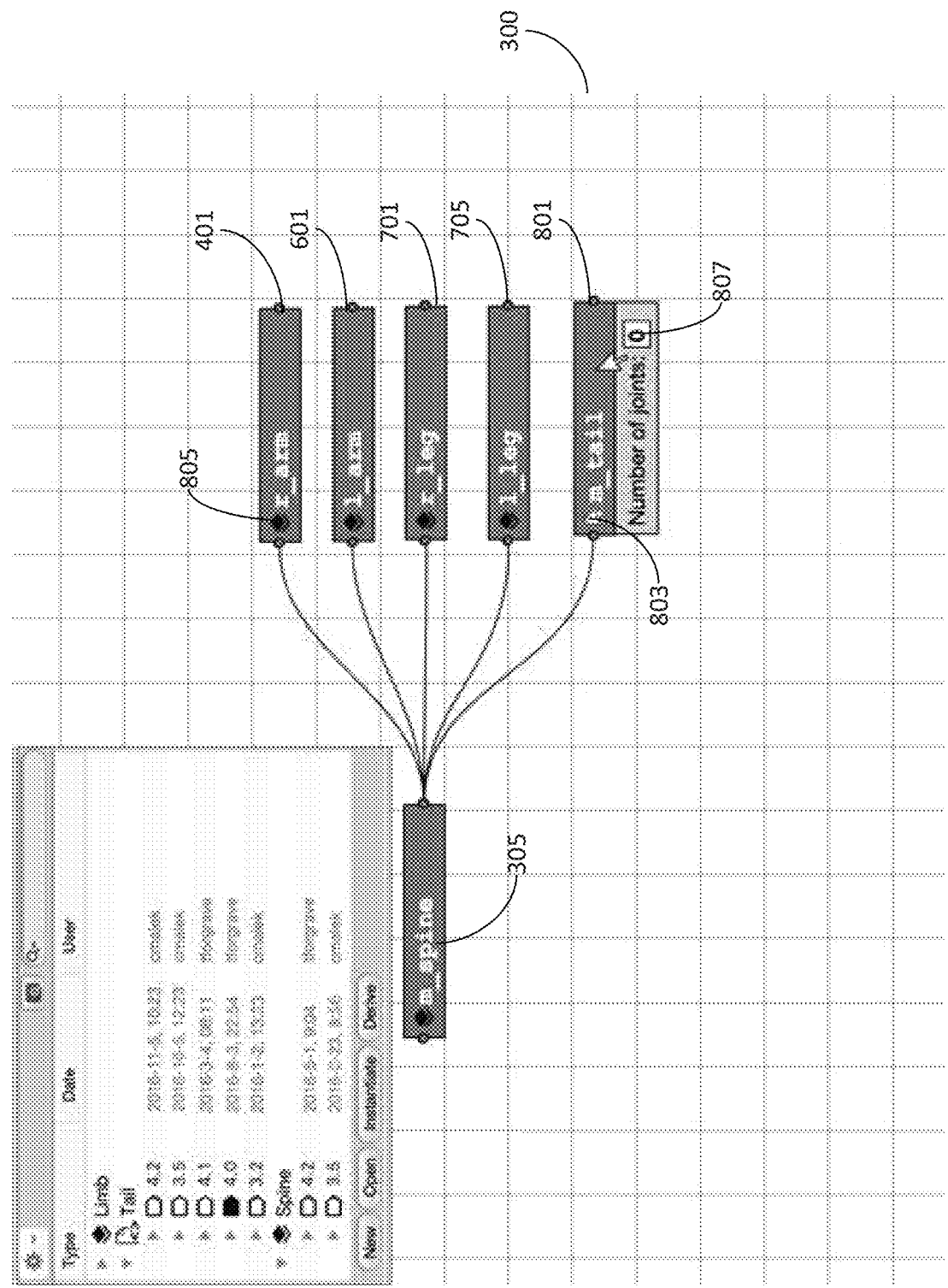

Referring to FIG. 8, a tail is to be added to the dragon character rig. As discussed above, the tail may be a module that benefits from being scripted. By parameterizing the number of joints in the tail, it becomes a more reusable and efficient module since there is no practical limit on the number of joints that a user can select, and the user does not have to rely on work-around designs, such as instantiating a 20-joint tail and manually disabling 12 of those joints to implement a tail with 8 joints.

In FIG. 8, the user may select a scriptable reference module corresponding to a tail, instantiated as a tail node 801, named m_tail in the dependency graph. The tail node

801 may display a graphic icon 803 indicating that the tail node 801 is instantiated using a scriptable reference module, where the other nodes 401, 601, 701, 705 may display a different icon 805 indicating their instantiation from precomputed reference modules. In some embodiments, the generated tail node 801—the data that is generated as a result of executing the script—otherwise referred to as a script artifact, may be placed on a separate layer of the interactive interface 300 designated only for script artifacts. In some embodiments, the interactive interface 300 may have additional layers corresponding to nodes generated from precomputed reference modules. The separation of the layers in the interactive interface 300 may not be visible or known to the user. In other embodiments, each node may include a tag value or associated metadata which identifies whether the node was generated by a precomputed reference module or a scriptable reference module. Thus, since each execution of a script generates a new instantiation of each node, by keeping script artifacts, such as the tail node 801, within a separate layer or identified by some other data point, the interactive interface 300 is able to efficiently identify the script artifacts and clear or delete them prior to the next execution of a particular scriptable reference module.

FIG. 8 shows that the tail node 801 displays an input field 807 for the available parameters for the scriptable reference module, which in this case is the number of joints in the tail. In some embodiments, the tail node 801 may be instantiated with an initial value of zero when the module is first selected for instantiation from the resource browser. In other embodiments, each scriptable reference module may include a non-zero default value for the initial instantiation so that a non-zero value node is generated for the first time. In yet other embodiments, the interactive interface 300 may display a separate input window or a pop up input window requesting input of any required parameter values prior to execution of the scriptable reference module from the resource browser. In any of these cases, the generated node resulting from executing the script may be further editable by the user using a displayed input parameter field, such as 807, for a next execution of the script. Additionally, although FIG. 8 depicts only one input field, other embodiments are considered with scriptable reference modules including more than one input parameter, as defined by a user according to anticipated needs associated with each particular reference module. Each parameter may correspond to a particular input field for user input of the parameter value. In some embodiments, the input field may include various types of input enabling interfaces, including text fields, number fields, radio buttons, sliders, knobs, graphs, curves, fields configured to accommodate stylus or touchscreen inputs, and the like.

To optimize performance and conserve computing resources, the scriptable reference module code may be executed only when required. Therefore in some embodiments, the script may be executed when the scriptable reference module is instantiated, when an input parameter value is modified (for example, if the number of tail segments is changed from 4 to 5), or when the scriptable reference module itself is modified in the library. The interactive interface 300 may identify the scriptable reference modules located on the separate scriptable module layer and execute the script for each module according to their graph dependencies using the script interpreter.

Figure 9:
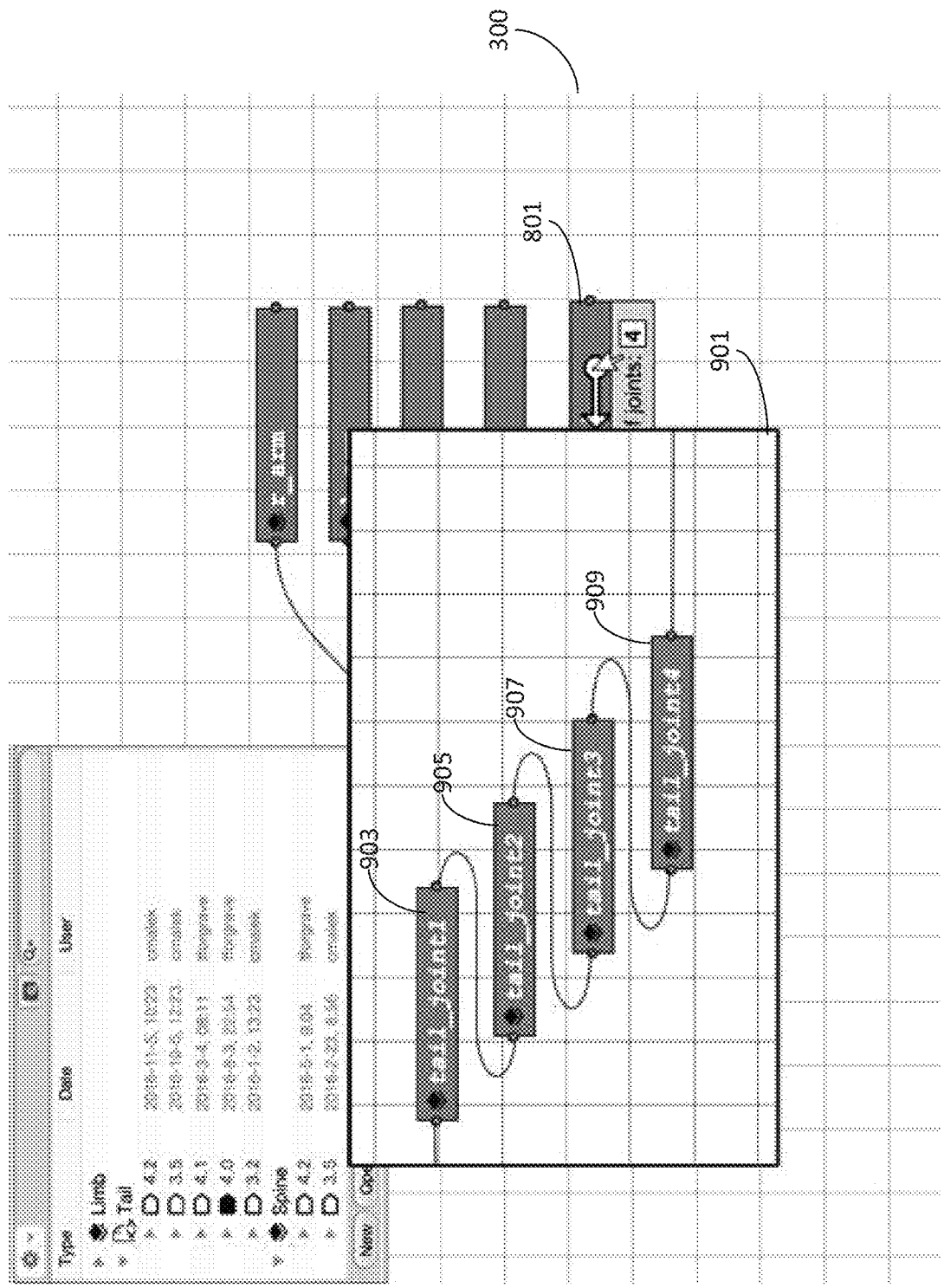

FIG. 9 shows an example of the tail node 801 being generated using an input parameter value of "4", indicating that the tail should have four joints. Once the script is executed using the input parameter value, the tail node 801 may be created (again, in some cases) with four joints 903, 905, 907, 909 making up the tail. The contents of the generated tail node 801 may be inspected and/or further edited by the user in the drill down window 901 of interactive interface 300, as shown in FIG. 9.

Figure 10:
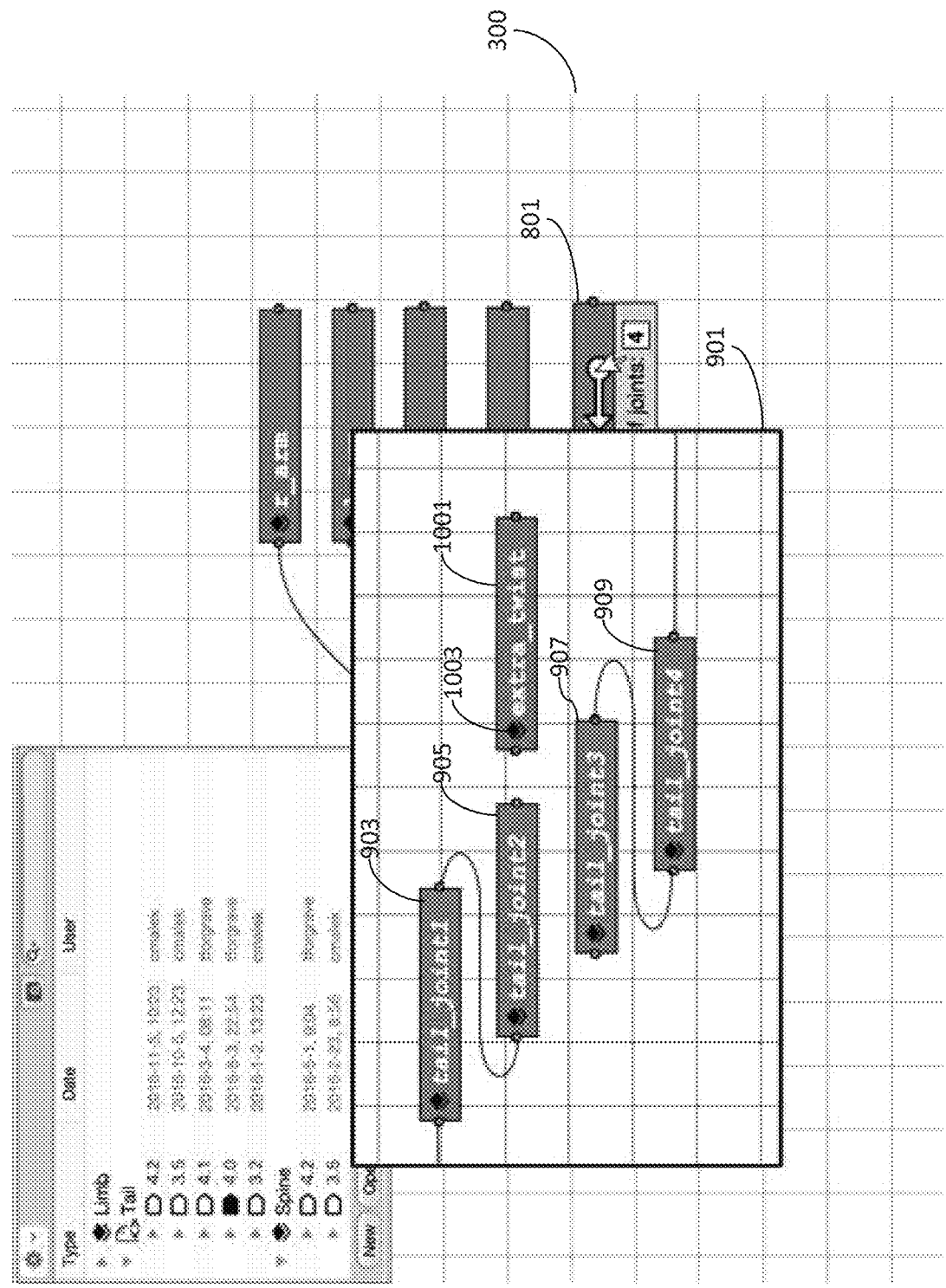

Further editing of generated nodes is shown in FIG. 10, where the user may wish to interactively apply some overrides to the script artifacts. For example, where the generated tail node 801 includes four joints 903, 905, 907, 909, the user may wish to include an extra twist node 1001 (or an extra element) between joint 2 node 905 and joint 3 node 907 of the tail. Thus, as shown in FIG. 10, the user may delete the connection between joint 2 node 905 and joint 3 node 907 and generate a new node, an extra twist node 1001 corresponding to an extra twist in the tail node 801. The extra_twist node 1001 may be generated from a precomputed reference module, as shown in FIG. 10 based on the displayed indicator 1003, or in other cases it may be generated from another scriptable reference module.

Figure 11:
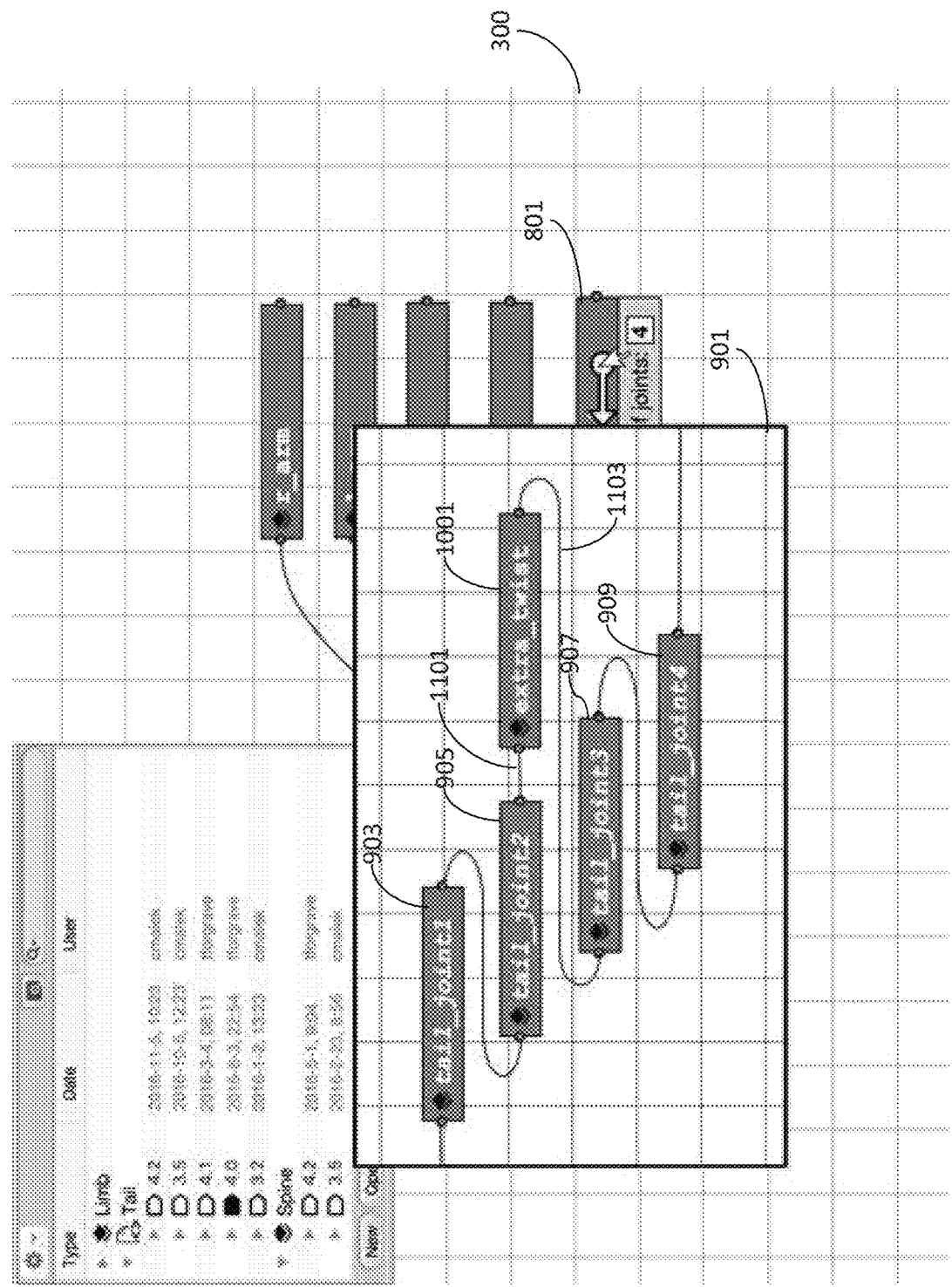

FIG. 11 shows the user creating new connections 1101, 1103 between the output of joint 2 node 905 and the input of the extra_twist node 1001, and between the output of the extra_twist node 1001 and the input of joint 3 node 907.

It is noted that these additional edits of the script-generated tail node 801 are not destructive in that the original scriptable reference module for m_tail is not changed based on the edits. The deletion of the connections between joint 2 node 905 and joint 3 node 907, the addition of the extra_twist node 1001, and the new connections between joints 2 node 905 and joint 3 node 907 and the extra twist node 1001 are all performed on top of the instantiated tail node 801, and the m_tail scriptable reference module maintained in the scriptable reference module library is not modified. This is similar to any overriding edits that the user may perform to modules generated using precomputed reference modules, wherein those overriding edits do not modify the stored precomputed reference modules in the library.

However, these additional edits need to be retained so that they can be applied again after the script artifacts are deleted and the script is re-executed. In some embodiments however, the entire dependency graph data itself is not stored in memory and instead the dependency graph and character rig is stored in a memory only as a set of pointers or references to the modules which were used to create the dependency graph. This allows for the stored data of the dependency graph to be lightweight and dynamic when it is accessed and re-executed for use or additional editing.

In the example of FIG. 11, the dependency graph itself may be stored as references to the scriptable reference module for the tail 801, including version number for the module, and references to the precomputed reference modules for the torso, arms, and legs, including version numbers for each module. In some embodiments, the input parameters to the scriptable reference module are also stored, for example the parameter input value of 4 to define the number of tail joints.

Accordingly, the additional edits are stored separately from the script artifacts. In some embodiments, the additional edits may be stored in a separate file which tracks the changes performed on top of the scriptable reference module artifacts. In some embodiments, the additional edits—otherwise referred to as the delta edits—may be stored in a scene description format file in the form of instructions for performing the delta edits. The scene description format file may include descriptions of the connections between the nodes of the dependency graph in a declarative format, typically in an ASCII format using a data serialization programming language such as YAML. When the dependency graph is opened by another user, or re-opened by the user, the referenced modules may be executed to generate the unedited nodes, and then the data from the scene description format file may be loaded automatically to apply the additional override editing performed by the user to restore the edited dependency graph for use or additional development.

In some embodiments, the script artifacts may be managed on a per script artifact module instance basis, for example when one parameter changes for one scriptable module instance. In some embodiments, layers may be used for the script artifacts, where each layer corresponds to a separate instantiation of the script module, and each layer is utilized to effectuate a particular edit to the script module. When a change is made to an input parameter related to an edit to the artifact instance, the layer corresponding to the input parameter including the script artifact may be cleared prior to interpreting the script again for instantiation.

Figure 12:
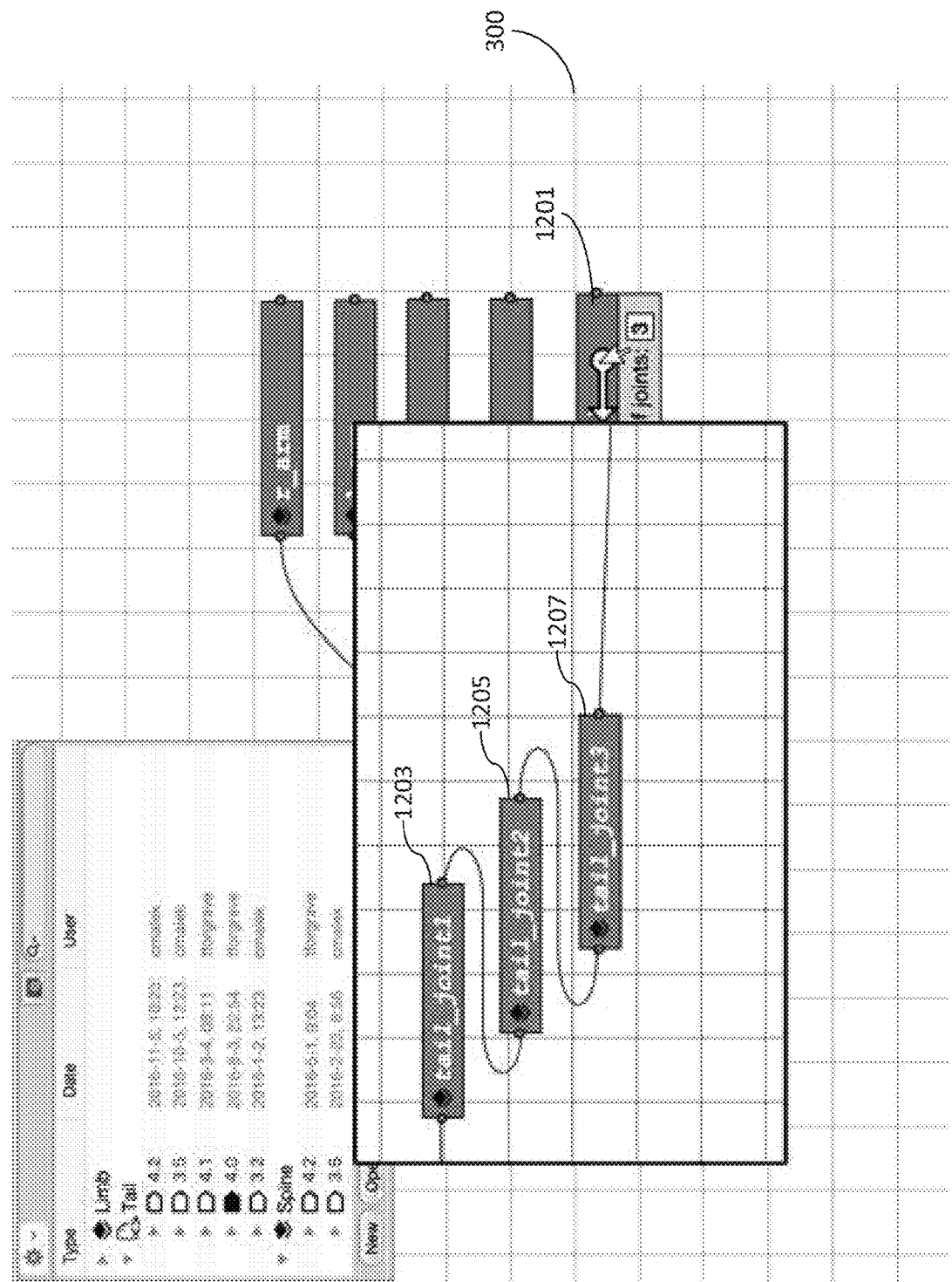

The stored instructions for the delta edits may be loaded and applied to the dependency graph even where certain input parameters for scriptable reference modules have changed. For example, the user may load the instructions for applying the delta edits from FIG. 11 (deleting the connection between joint 2 node 905 and joint 3 node 907, creating the extra_twist node 1001, connecting joint 2 node 905 to the input of extra_twist node 1001, and connecting extra_twist node 1001 to the input of joint 3 node 907) but may change the input parameter for the m_tail scriptable reference module from 4 to 3. In this case, a tail node 1201 with 3 joints 1203, 1205, 1207 instead of 4 joints may be generated as shown in FIG. 12.

Figure 13:
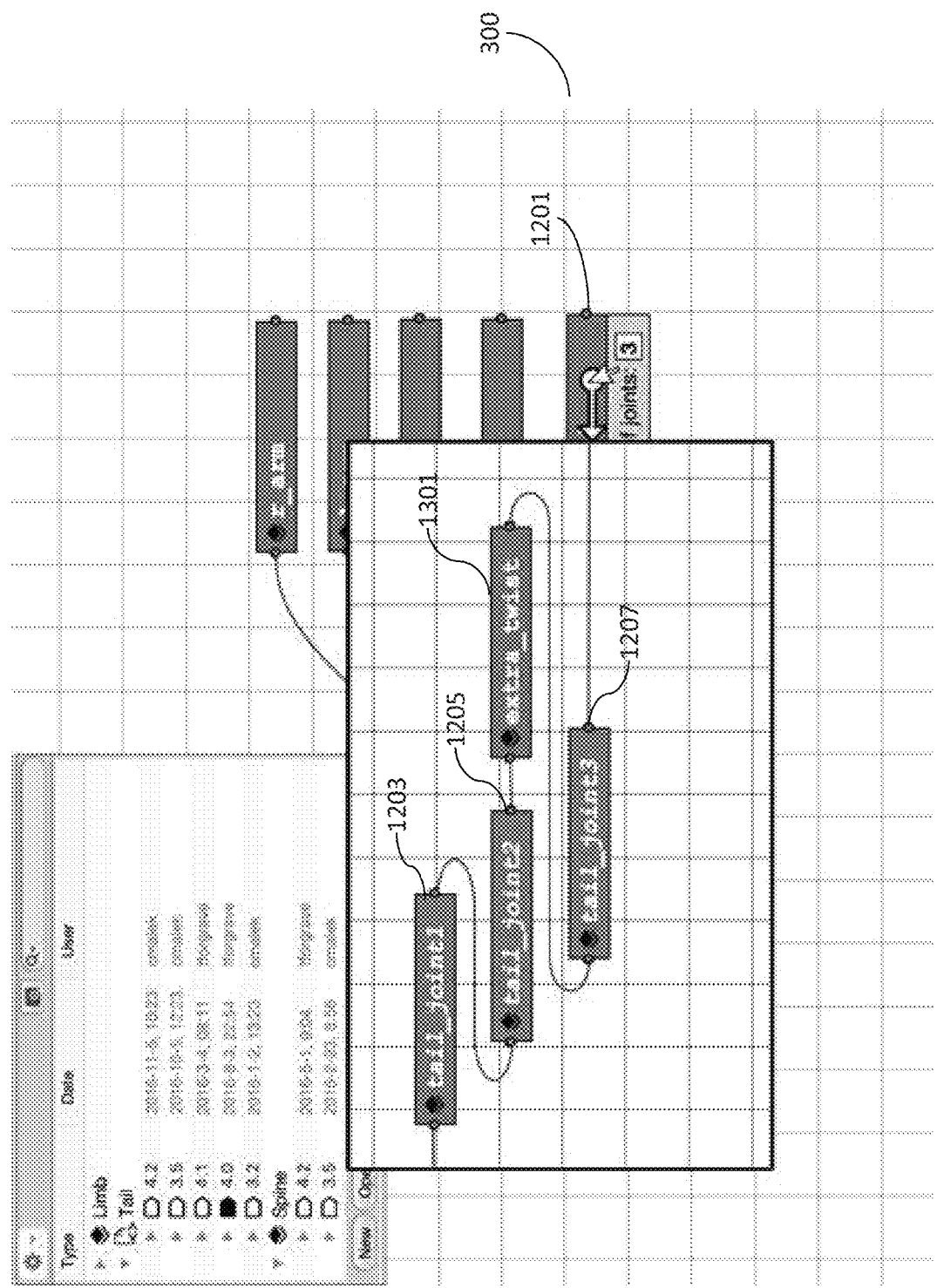

Thereafter the delta edit data from the scene description format may be loaded and the instructions performed to delete the connection between joint 2 node 1205 and joint 3 node 1207, create the extra_twist node 1301, connect joint 2 node 1205 to the input of extra_twist node 1301, and connect extra_twist node 1301 to the input of joint 3 node 1207, as shown in FIG. 13. In some cases, the delta edit information may no longer be applicable to a newly instantiated node due to the change to an input parameter of the scriptable reference module—for example where the input parameter for the tail is changed from 4 to 2 which would not allow the insertion of an extra twist between joints 2 and 3 as joint 3 node does not exist. Therefore, in some embodiments error handling is implemented to ensure that the elements and nodes which are to be acted upon by the delta edit instructions exist in the script artifact instantiated based on the new input parameters.

In some embodiments, the error handling may recognize that the required artifacts do not exist based on the new input parameters and exit the execution instructions or undo any already-performed instructions to leave the newly instantiated node without applying any of the delta edits. In other embodiments, the error handling may simply terminate the delta edits, leaving the dependency graph as-is and exiting the instructions at the point the deficiency is recognized. In yet other embodiments, the error handling may present the user with an additional interface, such as a pop-up window or additional input window, with a notification that the delta edits cannot be applied to the newly instantiated node based on the recognized deficiencies. In these cases, the additional interface may present options for the user to change the input parameters along with guidance on a minimum or maximum value of the input parameters—for example, providing information to the user that a minimum of 3 tail segments is required as an input parameter if the delta edits of FIG. 13 are to be executed (wherein an extra twist is inserted between joint 2 and joint 3).

In yet other embodiments, the scriptable reference module may be automatically re-executed with the minimum required parameter value to apply the delta edits (in this case 3) notwithstanding the user's input, and the delta edits applied to the resulting script artifacts. In these cases, the user may be notified with information that the script has been re-executed with an automatically selected parameter input value based on the requirements of the delta edit instructions.

As discussed, embodiments of the present disclosure may allow efficient and consistent tracking of versioning of modules and the rigs made from those modules. Referring back to FIG. 2, all versioning schemes may be combined into a single module versioning scheme 220 in embodiments of the present disclosure, including precomputed reference modules 214, scriptable reference modules 216, parameter values 217 input to the scriptable reference modules, as well as complete generated rigs 218.

If a node or connection of a generated rig which has been versioned is added or removed, the version number of that rig must be increased. Similarly, when a new version of a precomputed reference module or scriptable reference module is created—for example a new version of a left leg or a tail module, in the above examples—in order for the referencing module (for example, a completed rig) to incorporate the change to the updated left leg or tail module, the completed rig must also create a new version of itself to be versioned in the module versioning scheme 220.

Further, if a user changes the value of a parameter on an instantiated scripted module (for example in FIG. 9, if the user changes the number of tail segments from 4 to 3 in a generated and versioned character rig), then the module that instantiated the scripted tail module (the versioned character rig) must increase its own version numbering. Because of this unified approach, the user does not need to also track what version of a script, or parameters were used to construct the graph and manually track correspondences between them as they are all based on the same versioning scheme and tracked in the module versioning scheme 220.

Figure 14:
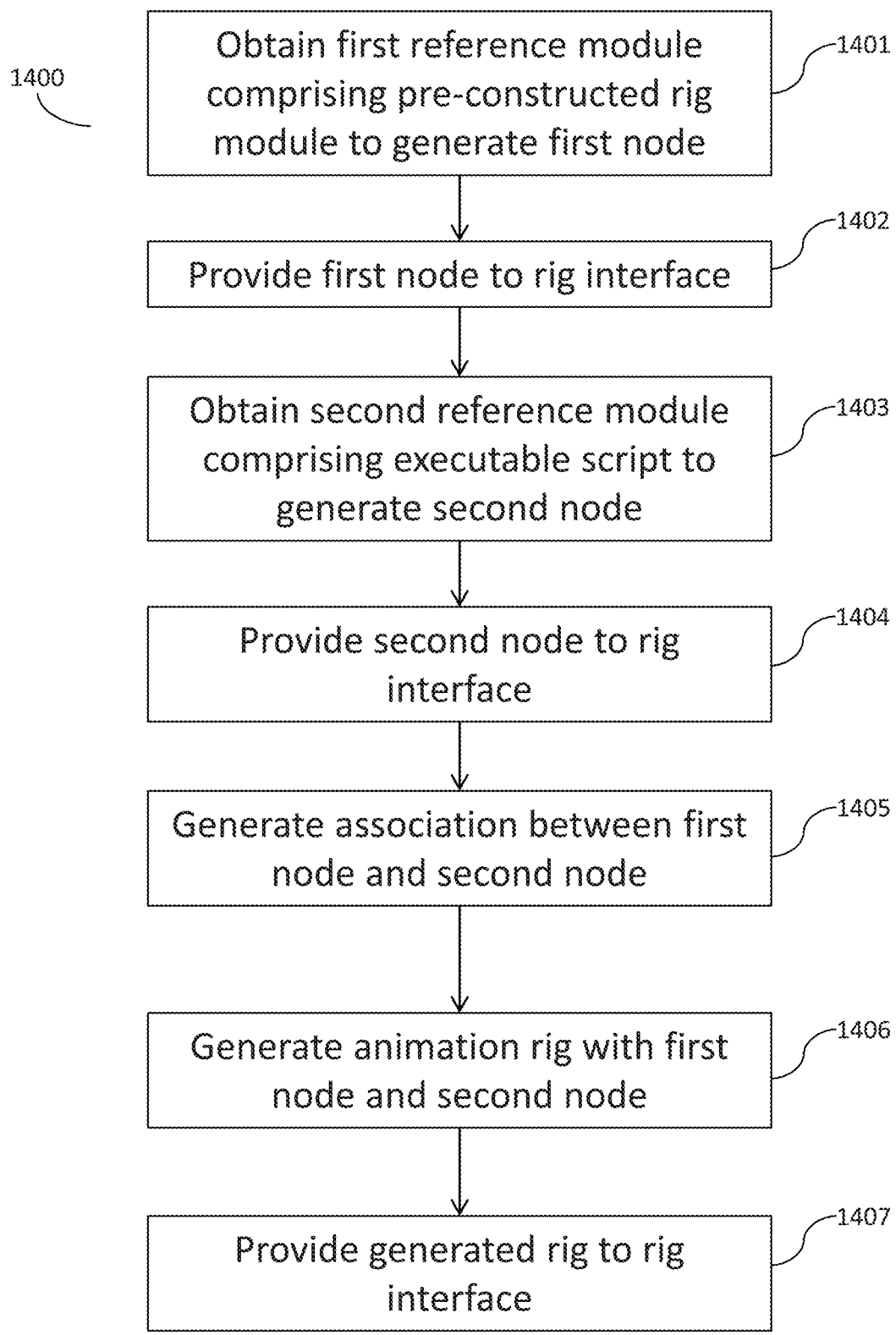
FIG. 14 is a flowchart illustrating a method for generating a character rig according to an embodiment of the present disclosure.

Referring now to FIG. 14, a flowchart 1400 depicting an example of an embodiment of the present disclosure is provided. At block 1401, a first reference module is obtained which includes a pre-constructed rig module to generate a first node of a dependency graph of a character rig. As discussed with respect to FIGS. 3-7, in some embodiments the interactive interface may include a resource browser allowing the user to browse available precomputed reference modules stored in the library and select a particular reference module to be obtained and instantiated in a view of a DCC. As discussed, a module library storing the available precomputed reference modules may be stored and provided from a memory. In some embodiments, each precomputed reference module may be associated with a unique identifier, wherein a selection for obtaining a particular precomputed reference module via the resource browser will generate a request to the module library for the particular file or data associated with the selected module's unique identifier. In embodiments of the present disclosure, the module library as shown in FIG. 2 may store and provide precomputed reference modules as well as scriptable reference modules maintained in the same library. The resource browser may include information for each module, including version, character type, preview images, and the like.

Next at block 1402, once the first node is generated using the obtained first reference module, the first node may be provided to a rig interface, which may include displaying a representation of the generated first node via an output device such as a display, or transmitting identifying information of the first node to the rig interface for additional processing and/or display. Again with reference to the discussions of FIGS. 5-7, when the user selects a precomputed reference module for the character rig, such as an arm or leg module, in some embodiments the user may input a command to instantiate the node using the precomputed reference module. Once generated, the instantiated node may be displayed on the interactive interface as a node representation of the dependency graph.

At block 1403, a second reference module is obtained which includes executable script to generate a second node of the dependency graph of the character rig. As discussed with respect to FIGS. 8 and 9, the user may select a scriptable reference module from the library which is executable to generate a node of the dependency graph. In embodiments of the present disclosure, the module library as shown in FIG. 2 may store and provide precomputed reference modules as well as scriptable reference modules maintained in the same library. Similar to the discussion of the first reference module above in block 1401, each precomputed reference module may be associated with a unique identifier, wherein a selection for obtaining a particular precomputed reference module, such as the second reference module, via the resource browser will generate a request to the module library for the particular file or data associated with the selected module's unique identifier. Further, in block 1404, the instantiated second node is provided to the rig interface, which may include displaying a representation of the generated second node via an output device such as a display, or transmitting identifying information of the second node to the rig interface for additional processing and/or display. In the example discussed in FIG. 8, the scriptable reference module corresponds to a tail, and a new node m_tail is instantiated in the dependency graph.

In some embodiments, the node may display a graphic icon indicating that the node is instantiated using a scriptable reference module, where the other nodes display an icon corresponding to precomputed reference modules. In some embodiments, the generated node—the data that is generated as a result of executing the script—otherwise referred to as a script artifact, may be placed on a separate layer of the dependency rig designated only for script artifacts, and in some embodiments, each layer may be dedicated to a separate instantiation of the script module.

Also as discussed, the scriptable reference module may be configured to receive input parameters for customizing the instantiation of the second node at execution of the script. As shown in the example of FIGS. 8 and 9, the interactive interface may display an input field for the user to input parameter values, for example the number of segments of a dragon's tail.

Next at block 1405, an association may be generated between the first node and the second node. Again with reference to FIG. 8, the user may utilize nodes instantiated from scriptable reference modules side-by-side with nodes instantiated from precomputed reference modules to generate dependencies or associations between them in the dependency graph. An example of generating an association includes using a user interface or other input method to input a connection between two displayed nodes, or displayed representations of nodes, as shown in FIG. 8. For example, a user may use a specific interface tool provided in FIG. 8 to draw a line connecting node 305 to each of the nodes 401, 601, 701, 705, and 801. In other embodiments, the connections between the nodes may be input via text, or other form of input. The interface inputs may be received and processed by the system to store data defining dependencies or associations between the stored data corresponding to each node represented in the interface. This allows the user to utilize the advantages of scripting for portions of the dependency graph which are treated the same way as precomputed modules, which may be used for other portions of the dependency graph.

At block 1406, the animation rig is generated using the first node and the second node, and at block 1407, the generated rig is provided to the rig interface, which may include displaying a representation of the generated rig via an output device such as a display. Generating the animation rig may include storing pointers and/or identifiers for each of the modules used for constructing the dependency graph. The stored data may represent a generated animation rig which may be selected from the resource browser or other file system and reopened for subsequent use or further editing. Generating the animation rig may also include committing the rig information to memory as a stored rig file, wherein all of the precomputed reference modules are instantiated and script of the scriptable reference modules are executed, where a flat character rig file is generated based on the modules and the resulting flat character rig file is stored in a memory. The generated animation rig, stored as pointers or stored as a flat file, may be processed by a graphics renderer, as discussed in FIG. 2, for displaying a 3D view of the character rig to a user as it may appear when utilized in an animation context, for example as shown in FIG. 1B.

As discussed above and with respect to FIGS. 1B, 1C, and 8, embodiments of the present disclosure enable users to generate character rigs utilizing the combined advantages of both the interactivity of precomputed reference modules with the customization of scripted reference modules. The generated character rigs may be displayed in a 3D view as shown in FIG. 1B or in a graph view as shown in FIG. 1C, for further modification or use in other animation processes.

Figure 15:
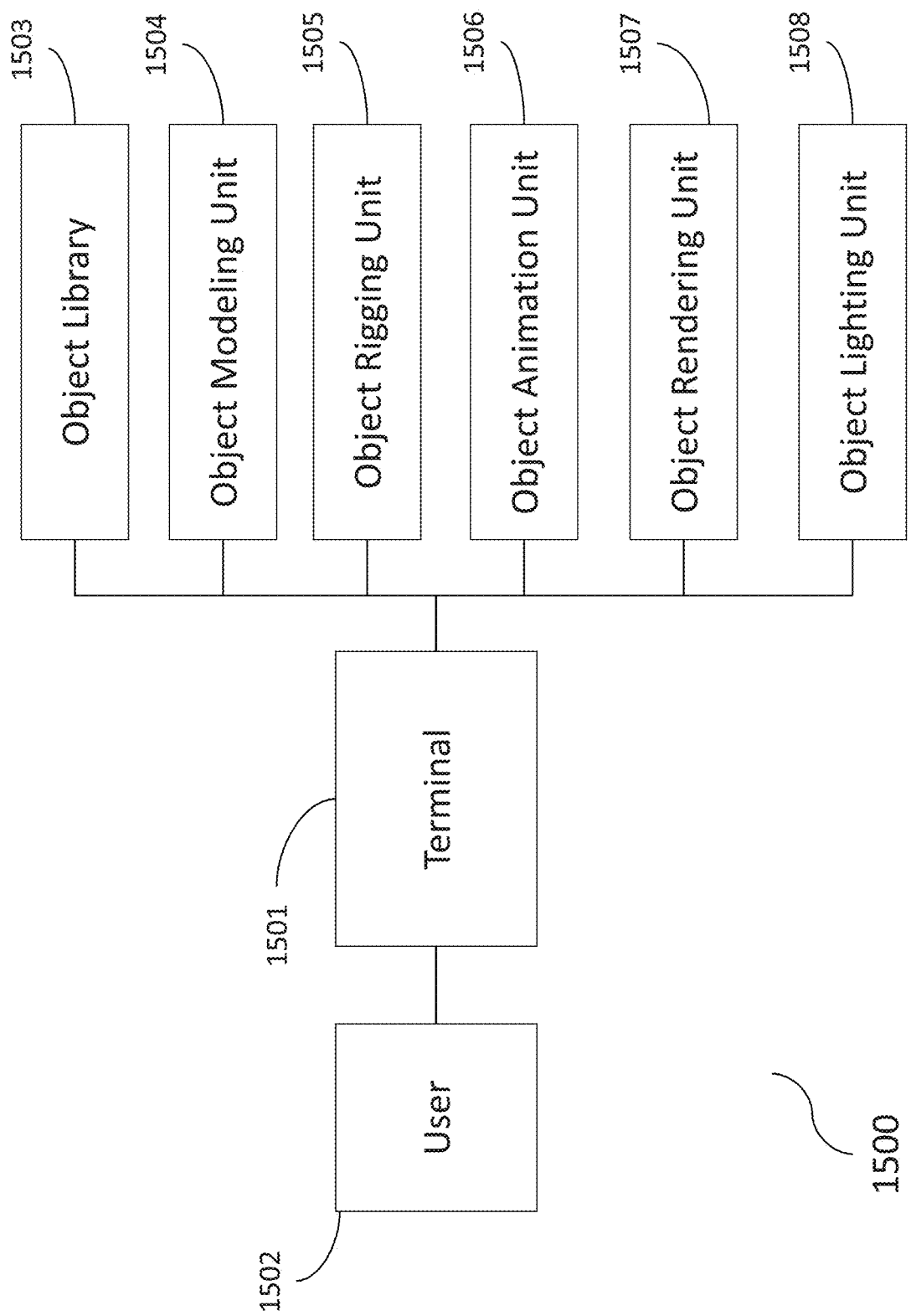
FIG. 15 is a diagram of a system implemented according to an embodiment of the present disclosure.

Referring now to FIG. 15, a simplified block diagram of a system 1500 for creating computer graphics imagery (CGI) and computer-aided animation is shown that may implement or incorporate various embodiments of the present disclosure. The system 1500 may include one or more terminals 1501. The one or more terminals 1501 may include hardware and software elements configured for designing CGI and assisting with computer-aided animation. The terminals 1501 may be implemented as a single computing device or a set of one or more computing devices, corresponding to computer hardware and/or software.

Examples of terminals 1501 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 1501 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 1500, a user 1502 may utilize the one or more terminals 1501 to design, create, or modify objects within a computer-generated interface displayed on display associated with the terminal 1501.

The terminal may implement, include, or otherwise be in operable communication with, systems and units including object library 1503, object modeling unit 1504, object rigging unit 1505, object animation unit 1506, object rendering unit 1507, and object lighting unit 1508. Object library 1503 may include software and/or hardware elements configured for storing and accessing information related to objects to be accessed, requested, retrieved, and/or used by the one or more terminals 1501 to design, create, and modify 3D models of objects in the CGI and animation processes.

Object modeling unit 1504 may include software and/or hardware elements and information to be accessed, requested, retrieved, and/or used by the one or more terminals 1501 to sculpt and design the 3D model to take on the desired appearance as instructed by user 1502, or other terminal operator during the CGI and animation process.

Object rigging unit 1505 may include software and/or hardware elements and information to be accessed, requested, retrieved, and/or used by the one or more terminals 1501 to design, create, or modify components of 3D models to define articulation points and movement ranges of various elements of the 3D model.

Object animation unit 1506 may include software and/or hardware elements and information to be accessed, requested, retrieved, and/or used by the one or more terminals 1501 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 1507 may include software and/or hardware elements and information to be accessed, requested, retrieved, and/or used by the one or more terminals 1501 to design, create, or modify a final appearance of the animated 3D model, including generating one or more images of one or more computer-generated objects, including textures, colors, rigging, controls, and the like.

Object lighting unit 1508 may include software and/or hardware elements and information to be accessed, requested, retrieved, and/or used by the one or more terminals 1501 to design, create, or modify lighting aspects of a 3D model and animated scenes, including defining lighting sources, shading, reflections, refractions, textures, colors, and the like. The one or more terminals 1501 may be in communication with one or more server computers which may operatively in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 1503, object modeling unit 1504, object rigging unit 1505, object animation unit 1506, object rendering unit 1507, object lighting unit 1508, and the like. The one or more terminals 1501, the one or more server computers, or any other aspect of the system 1500, may be associated or coupled with a display configured to display information, including a displayed interface for displaying, performing, executing, instructing, reviewing, and/or selecting operations of the present disclosure.

Figure 16:
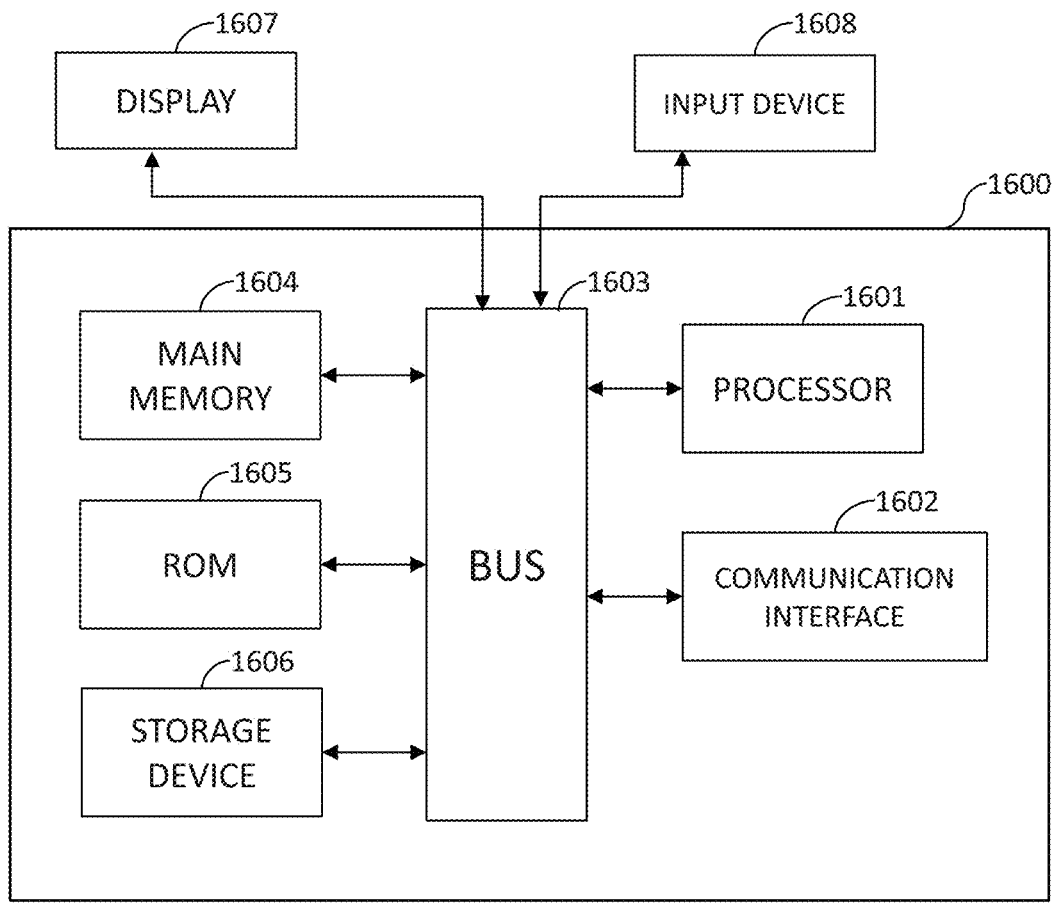
FIG. 16 is a diagram of an apparatus implemented according to an embodiment of the present disclosure.

Referring to FIG. 16, an illustration of an example computer 1600 is provided. One or more of aspects of the system 1500 discussed above in FIG. 15, such as the one or more systems 1500 or the one or more server computers, may be configured as or include such a computer 1600. In selected embodiments, the computer 1600 may include a bus 1603 (or multiple buses) or other communication mechanism, a processor 1601, main memory 1604, read only memory (ROM) 1605, one or more additional storage devices 1606, and/or a communication interface 1602, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1603 or other communication mechanism, including multiple such buses or mechanisms, may support communication of information within the computer 1600. The processor 1601 may be connected to the bus 1603 and process information. In selected embodiments, the processor 1601 may be a specialized or dedicated microprocessor configured to perform particular tasks in accordance with the features and aspects disclosed herein by executing machine-readable software code defining the particular tasks. Main memory 1604 (e.g., random access memory—or RAM—or other dynamic storage device) may be connected to the bus 1603 and store information and instructions to be executed by the processor 1601. Main memory 1604 may also store temporary variables or other intermediate information during execution of such instructions.

ROM 1605 or some other static storage device may be connected to a bus 1603 and store static information and instructions for the processor 1601. An additional storage device 1606 (e.g., a magnetic disk, optical disk, memory card, or the like) may be connected to the bus 1603. The main memory 1604, ROM 1605, and the additional storage device 1606 may include a non-transitory computer-readable medium holding information, instructions, or some combination thereof, for example instructions that when executed by the processor 1601, cause the computer 1600 to perform one or more operations of a method as described herein. A communication interface 1602 may also be connected to the bus 1603. A communication interface 1602 may provide or support two-way data communication between a computer 1600 and one or more external devices (e.g., other devices contained within the computing environment).

In selected embodiments, the computer 1600 may be connected (e.g., via a bus) to a display 1607. The display 1607 may use any suitable mechanism to communicate information to a user of a computer 1600. For example, the display 1607 may include or utilize a liquid crystal display (LCD), light emitting diode (LED) display, projector, or other display device to present information to a user of the computer 1600 in a visual display. One or more input devices 1608 (e.g., an alphanumeric keyboard, mouse, microphone, stylus pen) may be connected to the bus 1603 to communicate information and commands to the computer 1600. In selected embodiments, one input device 1608 may provide or support control over the positioning of a cursor to allow for selection and execution of various objects, files, programs, and the like provided by the computer 1600 and displayed by the display 1607.

The computer 1600 may be used to transmit, receive, decode, display, or the like one or more video files. In selected embodiments, such transmitting, receiving, decoding, and displaying may be in response to the processor 1601 executing one or more sequences of one or more instructions contained in main memory 1604. Such instructions may be read into main memory 1604 from another non-transitory computer-readable medium (e.g., a storage device).

Execution of sequences of instructions contained in main memory 1604 may cause the processor 1601 to perform one or more of the procedures or steps described herein. In selected embodiments, one or more processors in a multi-processing arrangement may also be employed to execute sequences of instructions contained in main memory 1604. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1601, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1602 may provide or support external, two-way data communication to or via a network link. For example, a communication interface 1602 may be a wireless network interface controller or a cellular radio providing a data communication network connection. Alternatively, a communication interface 1602 may comprise a local area network (LAN) card providing a data communication connection to a compatible LAN. In any such embodiment, a communication interface 1602 may send and receive electrical, electromagnetic, or optical signals conveying information.

A network link may provide data communication through one or more networks to other data devices (e.g., one or more terminals 1501 as shown in the system 1500). For example, a network link may provide a connection through a local network of a host computer or to data equipment operated by an Internet Service Provider (ISP). An ISP may, in turn, provide data communication services through the Internet. Accordingly, a computer 1600 may send and receive commands, data, or combinations thereof, including program code, through one or more networks, a network link, and communication interface 1602. Thus, the computer 1600 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for generating an animation rig comprising:
   obtaining a first reference module from a memory for generating a first node of a dependency graph of the animation rig and providing the first node to a rig interface, wherein the first reference module is a pre-computed rig module corresponding to the first node;
   obtaining a second reference module from the memory for generating a second node of the dependency graph and providing the second node to the rig interface, wherein the second reference module is scripting language data executed for generating the second node;
   generating an association between the first node and the second node in response to an input defining the association;
   generating the animation rig using the first node and the second node; and
   providing the generated animation rig to the rig interface,
   wherein the first node is stored in a first layer of the rig interface and the second node is stored in a second layer of the rig interface, and
   wherein the second layer is cleared prior to executing the scripting language data for generating the second node again.

2. The method of claim 1, wherein the scripting language data is configured to receive at least one or more parameters for use in generating the second node.

3. The method of claim 2, further comprising:
   displaying an input interface for receiving the at least one or more parameters; and
   receiving input data corresponding to the at least one or more parameters and inputting the received input data to the scripting language data of the second reference module.

4. The method of claim 3, further comprising:
   storing a first reference information corresponding to the first reference module;
   storing a second reference information corresponding to the second reference module; and storing the received input data corresponding to the at least one or more parameters for input to the scripting language data of the second reference module.

5. The method of claim 1, wherein the memory corresponds to an external server memory.

6. The method of claim 1, wherein the first reference module and the second reference module are obtained from a same module library stored in the memory.

7. The method of claim 1, further comprising:
changing the second node in response to receiving an editing input for applying changes to the second node; and
storing change data comprising the changes to the second node.

8. The method of claim 1, wherein a first version number of the first reference module and a second version number of the second reference module are maintained in a same versioning scheme stored in the memory.

9. A system for generating an animation rig comprising:
an input interface configured to receive inputs; and
one or more processors configured to:
obtain, from a memory associated with the system, a first reference module for generating a first node of a dependency graph of the animation rig and displaying the first node in a rig interface via a display, wherein the first reference module is a precomputed rig module corresponding to the first node;
obtain, from the memory, a second reference module for generating a second node of the dependency graph and displaying the second node in the rig interface via the display, wherein the second reference module is scripting language data executed for generating the second node;
generate an association between the first node and the second node in response to an input received via the input interface defining the association;
generate the animation rig using the first node and the second node; and
provide the generated animation rig in the rig interface for display,
wherein the first node is stored in a first layer of the rig interface and the second node is stored in a second layer of the rig interface, and
wherein the second layer is cleared prior to execution of the scripting language data for generating the second node again.

10. The system of claim 9, wherein the scripting language data is configured to receive at least one or more parameters for use in generating the second node.

11. The system of claim 10, wherein the one or more processors are further configured to:
provide an input interface via the display for receiving the at least one or more parameters;
receive input data via the input interface corresponding to the at least one or more parameters; and
input the received input data to the scripting language data of the second reference module.

12. The system of claim 11, wherein the one or more processors are further configured to:
store a first reference information corresponding to the first reference module;
store a second reference information corresponding to the second reference module; and
store the received input data corresponding to the at least one or more parameters for input to the scripting language data of the second reference module.

13. The system of claim 9, wherein the system further comprises a communication interface configured to communicate with an external server and the memory corresponds to a memory of the external server.

14. The system of claim 9, wherein the first reference module and the second reference module are obtained from a same module library stored in the memory.

15. The system of claim 9, wherein the one or more processors are further configured to:
change the second node in response to receiving an editing input for applying changes to the second node; and
store change data comprising the changes to the second node in the memory.

16. The system of claim 9, wherein a first version number of the first reference module and a second version number of the second reference module are maintained in a same versioning scheme stored in the memory.

17. A machine-readable non-transitory medium having stored thereon machine-executable instructions for generating an animation rig, the instructions comprising:
obtaining a first reference module from a memory for generating a first node of a dependency graph of the animation rig and providing the first node to a rig interface, wherein the first reference module is a precomputed rig module corresponding to the first node;
obtaining a second reference module from the memory for generating a second node of the dependency graph and providing the second node to the rig interface, wherein the second reference module is scripting language data executed for generating the second node;
generating an association between the first node and the second node in response to an input defining the association;
generating the animation rig using the first node and the second node; and
providing the generated animation rig to the rig interface,
wherein the first node is stored in a first layer of the rig interface and the second node is stored in a second layer of the rig interface, and
wherein the second layer is cleared prior to executing the scripting language data for generating the second node again.

18. The machine-readable non-transitory medium of claim 17, wherein the scripting language data is configured to receive at least one or more parameters for use in generating the second node.

19. The machine-readable non-transitory medium of claim 18, further comprising instructions for:
displaying an input interface for receiving the at least one or more parameters; and
receiving input data corresponding to the at least one or more parameters and inputting the received input data to the scripting language data of the second reference module.

20. The machine-readable non-transitory medium of claim 19, further comprising instructions for:
storing a first reference information corresponding to the first reference module;
storing a second reference information corresponding to the second reference module; and
storing the received input data corresponding to the at least one or more parameters for input to the scripting language data of the second reference module.

21. The machine-readable non-transitory medium of claim 17, wherein the memory corresponds to an external server memory.

22. The machine-readable non-transitory medium of claim 17, wherein the first reference module and the second reference module are obtained from a same module library stored in the memory.

23. The machine-readable non-transitory medium of claim 17, further comprising instructions for:
   changing the second node in response to receiving an editing input for applying changes to the second node; and
   storing change data comprising the changes to the second node.

24. The machine-readable non-transitory medium of claim 17, wherein a first version number of the first reference module and a second version number of the second reference module are maintained in a same versioning scheme stored in the memory.

\* \* \* \* \*